(12) United States Patent
Suzuki et al.

(10) Patent No.: US 7,035,348 B2
(45) Date of Patent: Apr. 25, 2006

(54) RECEIVER APPARATUS

(75) Inventors: Noriyoshi Suzuki, Aichi (JP);
Tomohisa Harada, Aichi (JP);
Tsutayuki Shibata, Aichi (JP);
Hisanori Uda, Aichi (JP); Hiroaki Hayashi, Aichi (JP); Nobuo Itoh, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 789 days.

(21) Appl. No.: 10/153,655

(22) Filed: May 24, 2002

(65) Prior Publication Data
US 2003/0128774 A1 Jul. 10, 2003

(30) Foreign Application Priority Data
May 25, 2001 (JP) .............................. 2001-157627

(51) Int. Cl.
H03K 9/00 (2006.01)
(52) U.S. Cl. ...................... 375/316; 375/347; 375/349; 455/132
(58) Field of Classification Search ................ 375/349, 375/347, 316; 455/132
See application file for complete search history.

(56) References Cited

U.S. PATENT DOCUMENTS

| 5,999,575 | A | * | 12/1999 | Tanaka et al. | ............... | 375/329 |
| 6,009,130 | A | * | 12/1999 | Lurey et al. | ................ | 375/347 |
| 6,321,200 | B1 | | 11/2001 | Casey | | |

FOREIGN PATENT DOCUMENTS

| EP | 1 039 311 A1 | 9/2000 |
| JP | 9-200165 | 7/1997 |
| JP | 2001-51689 | 2/2001 |

OTHER PUBLICATIONS

Takahiro Matsuda, et al. "Multimedia Wireless Transmission System Using Complex-Coefficient Multirate Filter Bank" B-I vol. J81-B-I No. 11. Nov. 1998, pp. 671-680.
Takahiro Matsuda, et al. "Application of Multirate Filter Bank To Group Demodulation of Frequency-Multiplexed TDMA Signals" B-I vol. J83-B No. 9. Sep. 2000, pp. 1217-1225.
Kojiro Nagashima, et al. "Its Simultaneous Software Radio Prototype" A-17-45 p. 426.

* cited by examiner

*Primary Examiner*—Stephen Chin
*Assistant Examiner*—Nasrin Hoque
(74) *Attorney, Agent, or Firm*—Oblon, Spivak, McClelland, Maier & Neustadt, P.C.

(57) ABSTRACT

A receiver configured to receive a plurality of signals k (k=1, 2, . . . , M) allocated in a first frequency band. The receiver includes a frequency conversion section for reallocating the signals k in a second frequency band for sampling by a single AD converter at a sampling frequency $f_s$ such that digital data of the sampled signals k are obtained in a third frequency band extending from zero Hz to a frequency represented by $f_s/2$; and a signal extraction section for extracting a target base band signal k from the digital data obtained by the AD conversion section. The frequency conversion section performs the reallocation in such a manner that at least a frequency represented by $Jf_s/2$ (J is an integer) is located between the frequencies of at least two of the signals k and that the sampled signals do not overlap.

33 Claims, 29 Drawing Sheets

RECEIVER APPARATUS

This is a patent application based on a Japanese patent application No. 2001-157627 which was filed on May 25, 2001 and which is incorporated herein by reference.

BACKGROUND OF THE INVENTION

1. Field of the Invention

The present invention relates to a receiver apparatus which receives substantially concurrently a plurality of signals that have been transmitted while being allocated in a broad band, and uses the received signals.

Therefore, the present invention can be used in various applications, such as RoF (Radio on Fiber) and radio units at base stations, which receive signals of a plurality of channels concurrently.

2. Description of the Related Art

FIGS. 26 to 29 are block diagrams showing the overall configurations of conventional receiver apparatuses (Conventional Examples 1 to 4). In these drawings, reference letter N represents the "number of providable media," and M represents the "number of signals which can be processed simultaneously."

Conventional Example 1 (FIG. 26)

<Processing Bands/Processing Scheme>
  (a) Channel extraction: RF band→IF band
  (b) Sampling: Base band
  (c) Orthogonal demodulation: analog <Features>
An anti-aliasing filter is used. Selection of each channel is performed in the IF band (analog).

Conventional Example 2 (FIG. 27)

<Processing Bands/Processing Scheme>
  (a) Channel extraction: IF band (RF band)→Base band
  (b) Sampling: Base band
  (c) Orthogonal demodulation: analog <Features>
Since reception signals are monitored in an analog section by means of, for example, channel scan (media scan), a hardware switch mechanism is provided. A direct conversion scheme in which extraction of each channel is performed in the base band (analog) is employed.

Conventional Example 3 (FIG. 28)

<Processing Bands/Processing Scheme>
  (a) Channel extraction: RF band→IF band
  (b) Sampling: IF band
  (c) Orthogonal demodulation: digital <Features>
A switch is used. Channel extraction is performed in the base band (digital).

Conventional Example 4 (FIG. 29)

<Processing Bands/Processing Scheme>
  (a) Channel extraction: IF band (RF band)→Base band
  (b) Sampling: IF band (RF band)
  (c) Orthogonal demodulation: digital <Features>
A switch is used. Channel extraction is performed in the IF band (analog).

Relevant techniques relating to these conventional techniques are disclosed in, for example, "Multimedia Wireless Transmission System Using Complex-Coefficient Multirate Filter Bank," IEICE transactions, B-I Vol. J81-B-1 No. 11, pp. 671–680, November 1998; "Application of Multirate Filter Bank to Group Demodulation of Frequency-Multiplexed TDMA Signals," IEICE transactions, B Vol. J83-B No. 9, pp. 1217–1225, September 2000; and "Development of Software Radio Apparatus for ITS Capable of Simultaneous Communications," Proceedings of the 2001 IEICE General Conference, A-17-45, pp. 426.

In order to increase flexibility (versatility) of signal processing to thereby cope with multimedia of a wide range of types, a larger part of signal processing as compared with conventional techniques must be realized by means of digital signal processing (software). However, simple replacement of a conventional technique with digital signal processing (software) results in a great increase in computational complexity imposed on a digital signal processing section, thereby rendering difficult enhancing flexibility and practicability of such signal processing.

Specifically, conventional techniques involve the following problems.

Problem 1:
In the case in which sampling is performed in the IF band, at least orthogonal demodulation must be performed by means of digital signal processing, thereby increasing the computational complexity for digital signal processing.

Problem 2:
In the case in which analog orthogonal demodulation is performed, the configuration can be simplified through employment of direct conversion; however, adverse effects may be caused by the orthogonality or the DC component.

Problem 3:
When concurrent processing of a plurality of services is desired, the scale of hardware must be increased.

Problem 4:
Since services (media signals) to be processed concurrently cannot be selected in advance, during periods for awaiting input signals, the analog section must perform channel scan (media scan).

SUMMARY OF THE INVENTION

The present invention has been accomplished in order to solve the above-described problems, and an object of the present invention is to simplify the configuration of a digital processing section of a receiver apparatus to thereby effectively reduce computational complexity imposed on the digital processing section.

Another object of the present invention is to simplify the configuration of a multimedia receiver apparatus to thereby reduce development cost and manufacturing cost of the multimedia receiver apparatus.

In order to achieve the above objects, the present invention provides the following.

According to a first aspect of the present invention, there is provided a receiver apparatus for receiving substantially concurrently a plurality of signals k (k=1, 2, . . . , M) that have been transmitted while being allocated in a broadband A (broad, first frequency band), the receiver apparatus comprising a frequency conversion section for reallocating the signals k in a predetermined frequency band B (second frequency band) within which the signals k can be sampled; an AD conversion section for sampling all the signals k having been reallocated into the frequency band B, at a sampling frequency $f_s$ such that digital data of the sampled signals k are obtained in a third frequency band extending from zero Hz to a frequency represented by $f_s/2$; and a signal extraction section for extracting a target signal k as a base band signal k from the digital data obtained through the sampling by the AD conversion section, wherein the frequency conversion section performs the reallocation in such a manner that at least a frequency represented by $Jf_s/2$ (J is an integer) is located between the frequencies of at least two of the reallocated signals k and that the sampled signals k do not overlap one another.

For example, in FIG. 2, the above-described frequency band B is provided in a region (range) of $f_s/4$ to $5f_s/4$ in the IF band. That is, the frequency band B is set to cover a frequency $Jf_s/2$ (J=1, 2) in the IF band.

Since the frequency band B is wide, the degree of freedom in allocation of the signals k within the frequency band B increases, and thus the following effects can be attained.

(1) In the case in which various media reception operations are realized synchronously in a single receiver apparatus, sampling of all signals to be processed (the overall frequency band B) becomes possible through allocation of the respective signals in the predetermined frequency band B as described above. Further, since a hardware portion (receiving section) which performs analog processing includes a frequency conversion section and a band-pass filter section only, and only a single AD converter is required, the overall configuration of the receiver apparatus can be simplified.

(2) In some cases, the number of operations of signal processing that the frequency conversion section must perform (the number of media signals to be processed) can be reduced. For example, when only a media signal 3 in FIG. 2 is located in the IF band even in the broadband A, the frequency conversion section may omit frequency conversion processing for the media signal 3. In such a case, frequency conversion processing is performed for only media signals 1 and 2 in such a manner that the signals 1, 2, and 3 do not overlap with one another after sampling.

Accordingly, the reception apparatus according to the first aspect can effectively reduce the signal processing overhead of the frequency conversion section.

According to a second aspect of the present invention, there is provided a receiver apparatus for receiving substantially concurrently a plurality of signals k (k=1, 2, . . . , M) that have been transmitted while being allocated in the broadband A (broad, first frequency band), the receiver apparatus comprising a frequency conversion section for reallocating the signals k into the predetermined frequency band B (second frequency band) within which the signals k can be sampled; an AD conversion section for sampling all the signals k having been reallocated to the frequency band B at a sampling frequency $f_s$ such that digital data of the sampled signals k are obtained in a third frequency band extending from zero Hz to a frequency represented by $f_s/2$; and a signal extraction section for extracting a target signal k as a base band signal k from the digital data obtained through the sampling by the AD conversion section, wherein the frequency conversion section performs the reallocation in such a manner that the sampling frequency $f_s$ of the AD conversion section becomes equal to a frequency represented by $n_k F_k$, where $n_k$ is an integer, and $F_k$ is a predetermined frequency greater than each bandwidth $d_k$ of the signals k, that each center frequency $f_{ck}$ of the signals k becomes equal to a frequency represented by $m_k F_k/4$, where $m_k$ is an integer (integer multiple: if "I≠L," then "$m_I \neq m_L$"), and that the sampled signals do not overlap one another.

The above-described configuration simplifies frequency shift processing which a channel extraction section (digital signal processing section) performs for signals obtained through down sampling in order to convert the signals k to complex base band signals. In other words, when the down sampling of 1/n is performed, a phase shift angle ($2\pi n(\Delta f/f_s)$) per each sampling to be used during the frequency shift after down sampling becomes multiple of $\pi/2$. Therefore, multiplication with a complex sinusoidal wave (exp ($2\pi i(\Delta f/f_s)t$)) for realizing the frequency shift becomes unnecessary, and the frequency shift processing can be realized by processing of reversing the sign or processing of exchanging the real part with the imaginary part. This greatly simplifies the configuration of the digital signal processing section.

Since the configuration according to the second aspect mitigates the restriction imposed on the center frequency $f_{ck}$ of each signal k, the signals k can be reallocated in the frequency band B with a relatively high degree of freedom. In other words, the configuration according to the second aspect enables a relatively high degree of freedom in determining the form by which the signals k are allocated.

In the receiver apparatus according to the first aspect, the frequency conversion section preferably performs the reallocation in such a manner that the sampling frequency $f_s$ of the AD conversion section becomes equal to a frequency represented by $n_k F_k$, where $n_k$ is an integer, and $F_k$ is a predetermined frequency greater than each bandwidth $d_k$ of the signals k, and that each center frequency $f_{ck}$ of the signals k becomes equal to a frequency represented by $m_k F_k/4$, where $m_k$ is an integer (integer multiple: if "I≠L," then "$m_I \neq m_L$").

In other words, the configuration according to the first aspect and the configuration according to the second aspect may be combined. Even in such a case, an action and effects similar to those as described above can be attained.

The above-described integer $m_k$ corresponding to each of the signals k is preferably a multiple of 2. In this case, multiplication with a complex number for frequency shift becomes unnecessary during the above-described frequency shift processing for converting the signals k to complex base band signals, whereby the frequency shift processing can be realized by the processing of reversing the sign only. This further simplifies the configuration of the digital signal processing section.

More preferably, the integer $m_k$ corresponding to each of the signals k is multiple of 4. In this case, the above-described frequency shift processing for converting the signals k to complex base band signals becomes unnecessary, and the configuration of the channel extraction section (digital signal processing section) can be further simplified.

According to a third aspect of the present invention, there is provided a receiver apparatus for receiving substantially concurrently a plurality of signals k (k=1, 2, . . . , M) that have been transmitted while being allocated in the broadband A (broad, first frequency band), the receiver apparatus comprising a frequency conversion section for reallocating the signals k into the predetermined frequency band B (second frequency band) within which the signals k can be sampled; an AD conversion section for sampling all the signals k having being reallocated into the frequency band B, at a sampling frequency $f_s$ such that digital data of the sampled signals k are obtained in a third frequency band extending from zero Hz to a frequency represented by $f_s/2$; and a signal extraction section for extracting a target signal k as a base band signal k from the digital data obtained through the sampling by the AD conversion section, wherein the signal extraction section includes a digital filter section for filtering the digital data, and a down sampling section for down-sampling the filtered digital data, and the frequency conversion section performs the reallocation in such a manner that the sampled signals do not overlap one another.

The receiver apparatus of the third aspect having the above-described configuration achieves the following effects. In the case in which various media reception operations are realized synchronously in a single receiver apparatus, sampling of all signals to be processed (the overall frequency band B) becomes possible through allocation of the respective signals in the predetermined frequency band B as described above. Further, since a hardware part (receiving section) which performs analog processing includes a frequency conversion section and a band-pass processing section only, and only a single AD converter is required, the overall configuration of the receiver apparatus can be simplified.

In the receiver apparatuses according to the first and second aspects, the signal extraction section may include a digital filter section for filtering the digital data, and a down sampling section for down-sampling the filtered digital data.

The signal extraction section used in the first, second, and third aspects is not necessarily required to have a frequency shift section for performing the above-described frequency shift. That is, such a frequency shift section may be omitted through employment of the above-described feature that the integer $m_k$ corresponding to each of the signals k is multiple of 4. However, the frequency shift section may be provided in addition to the above-described digital filter section and down sampling section.

The digital filter section may include a Hilbert transformer. In this case, the receiver apparatus of the present invention can be implemented without use of a complex-coefficient filter.

The digital filter section may include band-pass filters (BPFs) corresponding to the signals k, respectively. Further, the digital filter section may include a cascade of two band filter banks.

The digital filter section may include a complex discrete Fourier transform filter bank. In this case, the receiver apparatus of the present invention can be implemented without use of a Hilbert transformer.

Further, since employment of a complex discrete Fourier transform filter bank results in formation of a configuration such that filters having real-number coefficients are connected in parallel, calculation of complex coefficients (multiplication of complex numbers) becomes unnecessary, and therefore calculation becomes simple, which facilitates simplification of the configuration.

The digital filter section may include a tap coefficient setting section for setting tap coefficients for the respective signals k to be used in digital filter processing, wherein the tap coefficient setting section successively outputs sets of M tap coefficients $\tau_k$ in a periodical and time-division fashion for output of M target base band signals k.

Since the combined use of a filter for extracting each channel (media) and down sampling decreases the sampling rate of respective signals k obtained through channel extraction, simultaneous processing of filter outputs for extracting the respective channels (signals k) is not required if the timings of down sampling for the plurality of simultaneously received signals k are slightly shifted from one another. That is, when the above-described configuration is employed, the procedure of the filter output processing can be realized by means of time slicing.

Accordingly, since the setting of the channel extraction filter is changed successively in accordance with channels to be extracted, the channel extraction section can be formed by a single channel extraction filter, whereby the configuration of the digital signal processing section can be further simplified. The digital filter section as described above may be configured by use of, for example, a transversal filter.

Preferably, the digital filter section includes a complex discrete Fourier transform filter bank, and each of the tap coefficients $\tau_k$ contains a phase correction term $a_k$ for the corresponding signal k. This configuration enables the tap coefficient setting section to have a frequency shift function for converting each signal k to a complex base band signal by shifting the frequency, thereby further simplifying the configuration of the digital signal processing section.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

The present invention will now be described with reference to preferred embodiments; however, the present invention is not limited to the embodiments.

Figure 1:
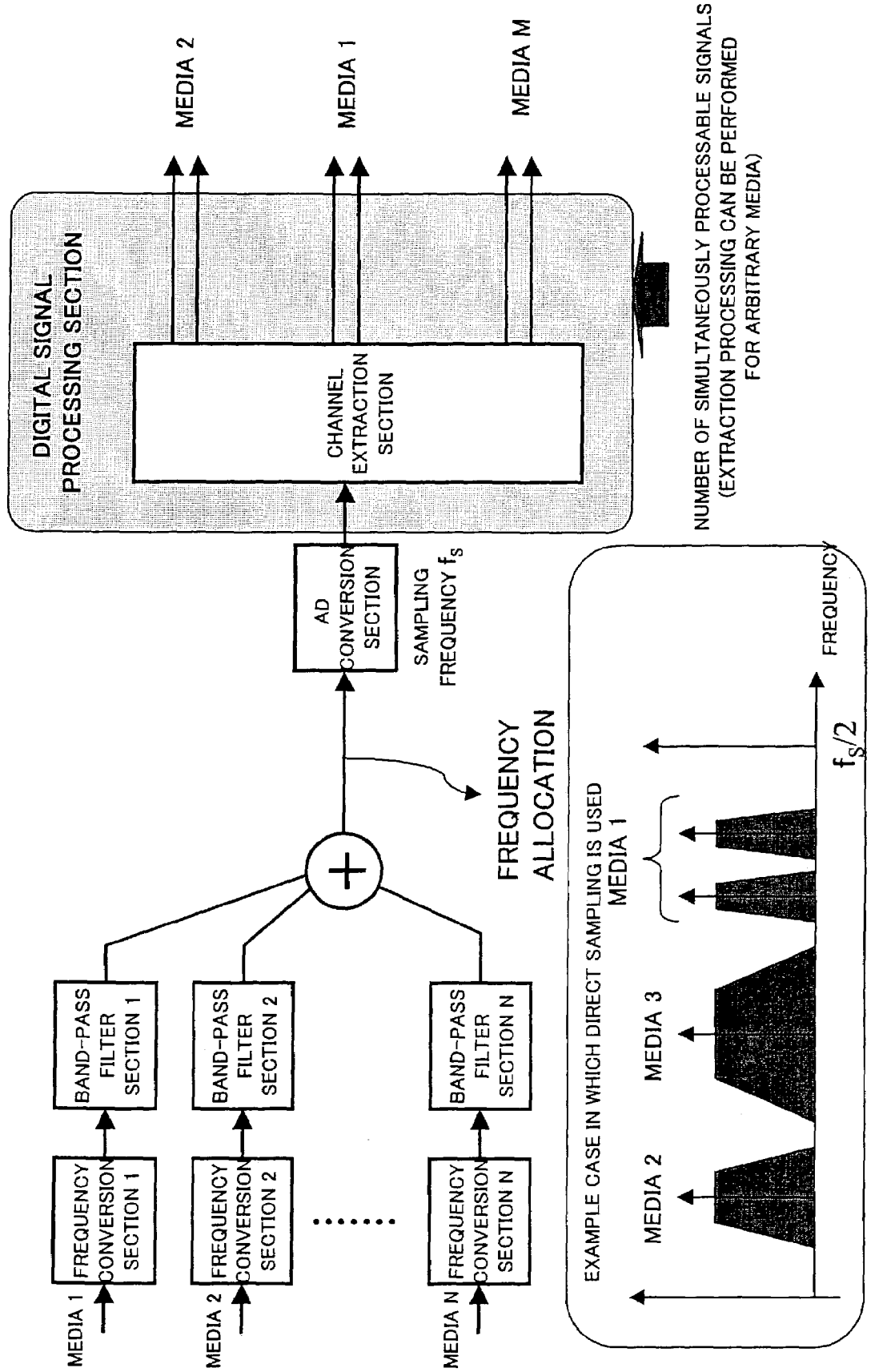
FIG. 1 is a block diagram showing the overall configuration of a receiver apparatus according to a first embodiment of the present invention.

First Embodiment:

FIG. 1 is a block diagram showing the overall configuration of a receiver apparatus according to a first embodiment of the present invention. The receiver apparatus of the present embodiment is configured in accordance with a first aspect of the present invention. Frequency conversion sections reallocate a plurality of signals, each represented as the $k^{th}$ signal (k=1, 2, ..., M) (hereinafter may be referred to as signals k), in a frequency band B (second frequency band) for enabling sampling in such a manner that at least a frequency represented by $Jf_s/2$ (J is an integer) is located between the frequencies of the signals k and that the sampled signals do not overlap one another.

Specifically, the plurality of signals k transmitted while being allocated in the RF band (broadband A) are reallocated in a predetermined range (frequency band B) which is in the IF band and within which all of the signals k can be sampled by a single AD converter. This reallocation is performed on each signal individually.

For example, a media signal 1 shown in FIG. 1 is frequency-converted by a frequency conversion section 1 to a predetermined frequency, passed through a band-pass filter 1, and then reallocated in the frequency band B. For simplicity, FIG. 1 shows a "frequency allocation" for the case of direct sampling.

In the case of direct sampling, a frequency range $(0, f_s/2)$ is chosen as the frequency band B. Through repetition of similar processing, media signals 2, 3, etc. can be reallocated as shown in FIG. 1.

An AD conversion section samples at a sampling frequency $f_s$ the signals k (k=1, 2, ..., M) reallocated in the frequency band B. This enables the signals k to be processed as digital signals in subsequent stages. A digital signal processing section mainly performs processing for extracting channels (signals k).

Figure 2:
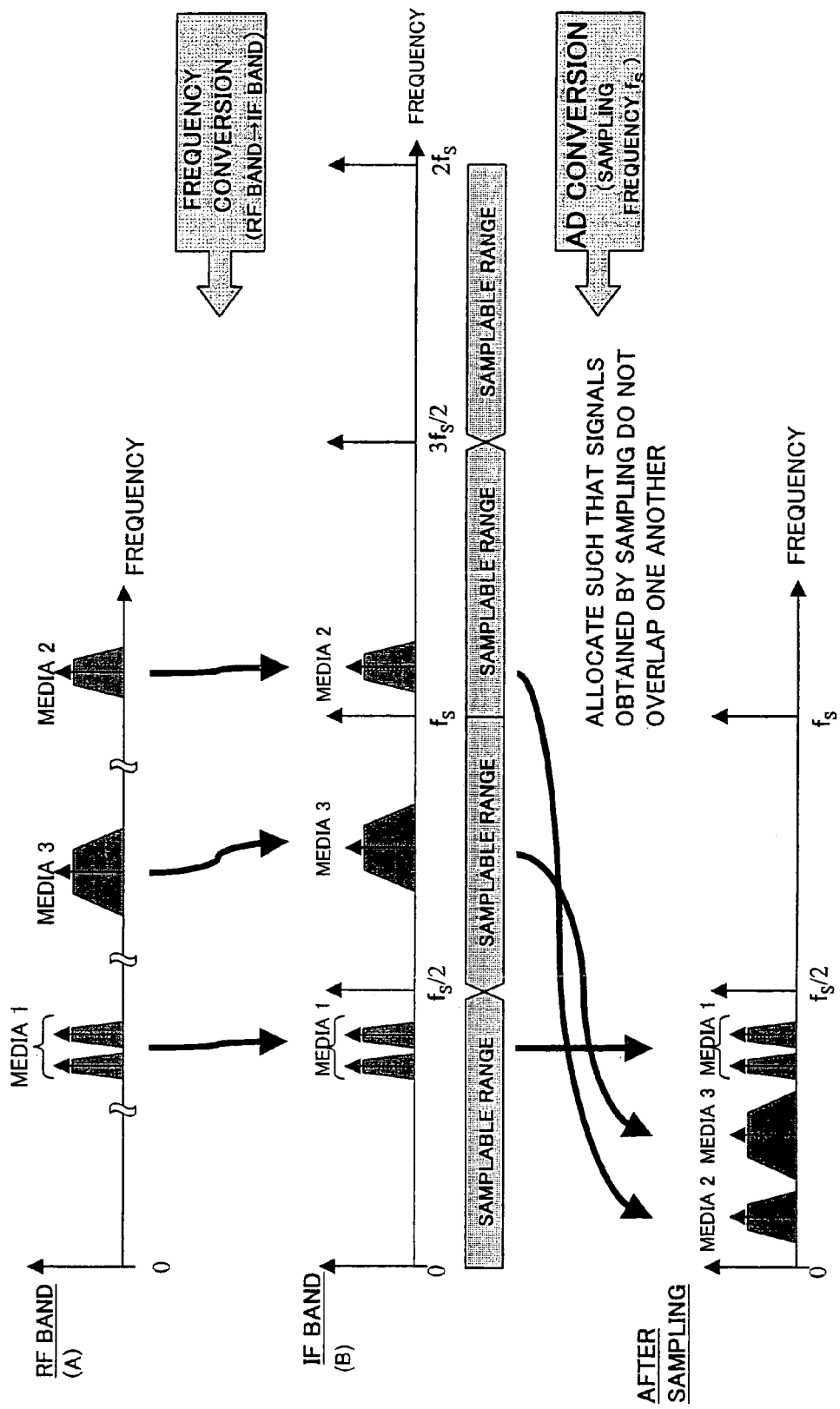
FIG. 2 is a set of graphs showing the frequency allocations before and after AD conversion (sampling) in the receiver apparatus of the first embodiment.

FIG. 2 is a set of graphs showing example frequency allocations before and after AD conversion (sampling) in the receiver apparatus of the first embodiment. As shown in FIG. 2, the frequency allocations may be determined in such a manner that direct sampling and under sampling are used in combination (first aspect of the present invention). When the reallocation (A→B) is performed, the frequency allocations must be determined such that the respective signals k do not overlap one another after performance of AD conversion (after sampling).

Figure 3:
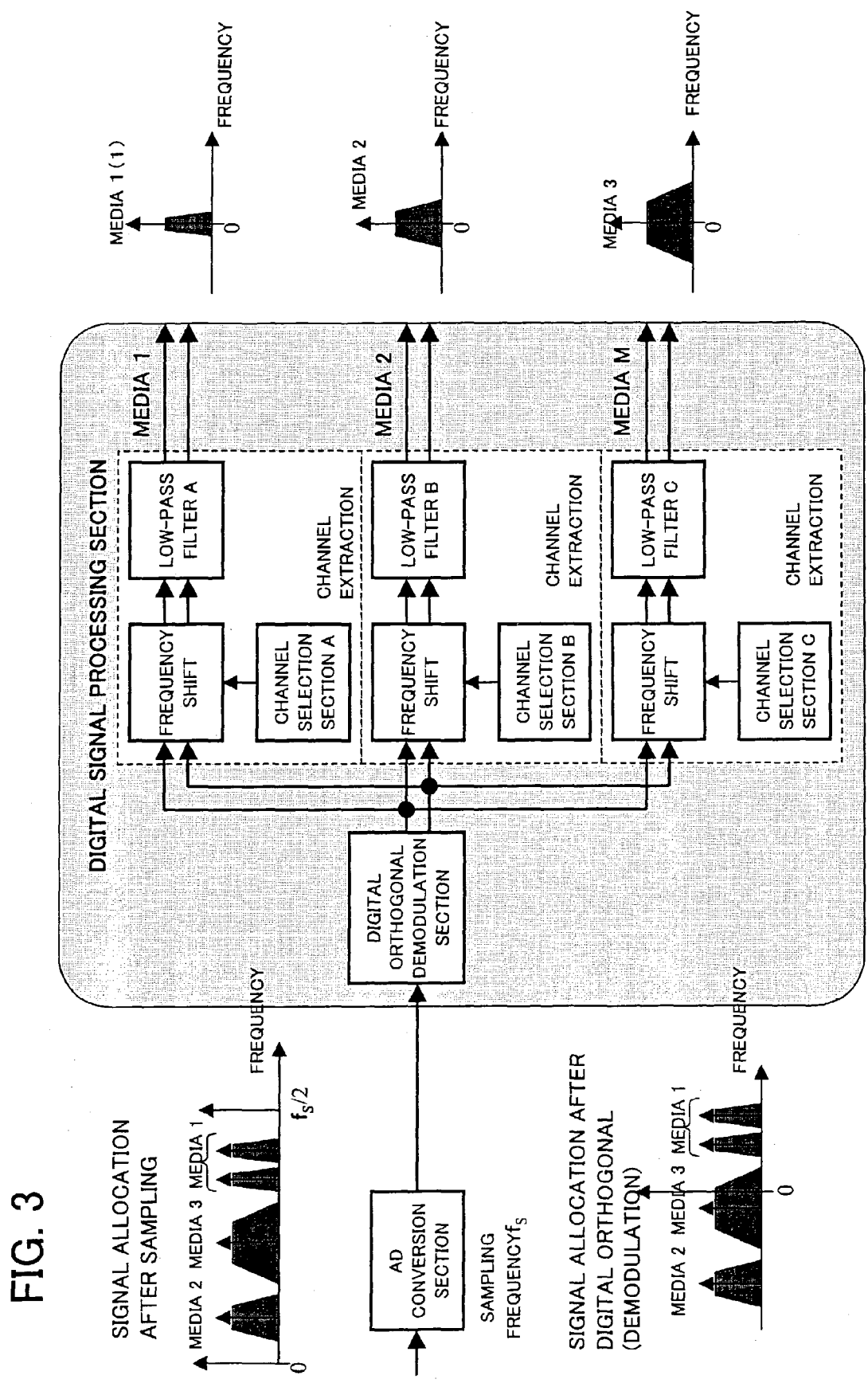
FIG. 3 is a block diagram showing a first scheme of processing digital signals after AD conversion in the receiver apparatus of the first embodiment.

FIG. 3 is a block diagram showing a first scheme of processing digital signals after AD conversion in the receiver apparatus of the first embodiment. FIG. 3 shows in detail the first processing scheme (processing scheme 1A) of the digital signal processing section (channel extraction section) of FIG. 1.

Figure 4:
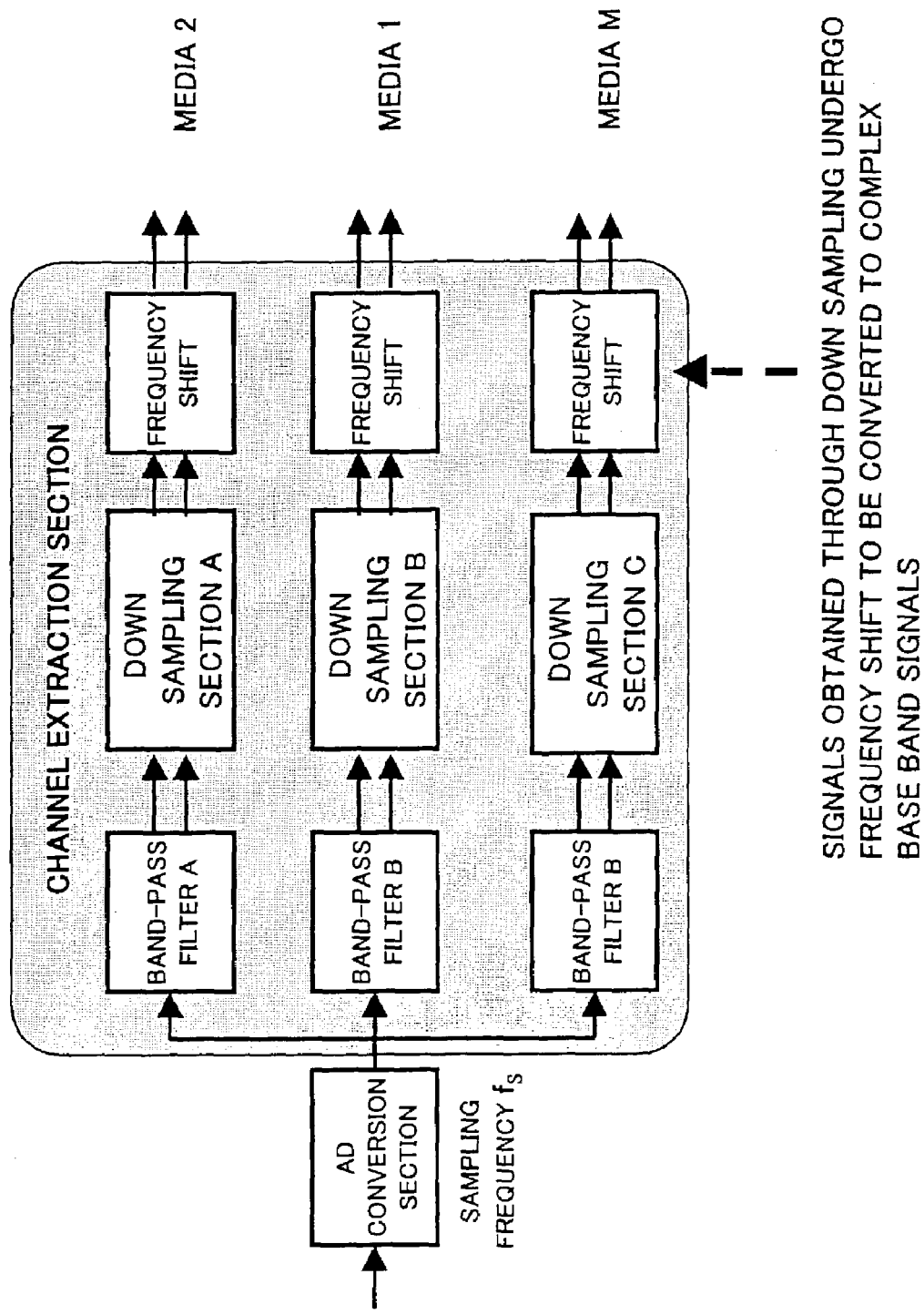
FIG. 4 is a block diagram showing a second scheme of processing digital signals after AD conversion in the receiver apparatus of the first embodiment.

FIG. 4 is a block diagram showing a second scheme of processing digital signals after AD conversion in the receiver apparatus of the first embodiment. FIG. 4 shows in detail the second processing scheme (processing scheme 1B) of the digital signal processing section (channel extraction section) of FIG. 1.

For example, in a frequency shift section of the digital processing section (channel extraction section) employing the processing scheme 1B (FIG. 4), which can be used in the receiver apparatus of the first embodiment, when down sampling of 1/n is to be performed, a phase shift of $2\pi n(\Delta f/f_s)$ is effected before each sampling operation. Through this frequency shift, each signal k can be converted to a target complex base band signal. Notably, $\Delta f$ represents a frequency shift which the frequency shift section must achieve.

The above processing is used, for example, when signals k cannot be converted to base band signals through only simple down sampling.

One example of effective schemes which are similar or equivalent to that employed in the above-described frequency shift section is a scheme (according to a third modification shown in FIG. 25) in which the signals k are moved in advance to a frequency range within which the signals k can be converted to base band signals through simple down sampling. In this case, the down sampling can be effected through a simple operation of shifting the phase by $2\pi(\Delta f/f_s)$ before each sampling operation.

Second Embodiment:

In the receiver apparatus according to the first embodiment, the frequency shift section executes multiplication with a complex sinusoidal wave. In the receiver apparatus according to a second embodiment, a configuration (method) such that the phase of the complex sinusoidal wave is naturally shifted to $n\pi/2$ (n is an integer) before each sampling is introduced, in order to simplify the configuration (processing) of the frequency shift section.

Figure 5:
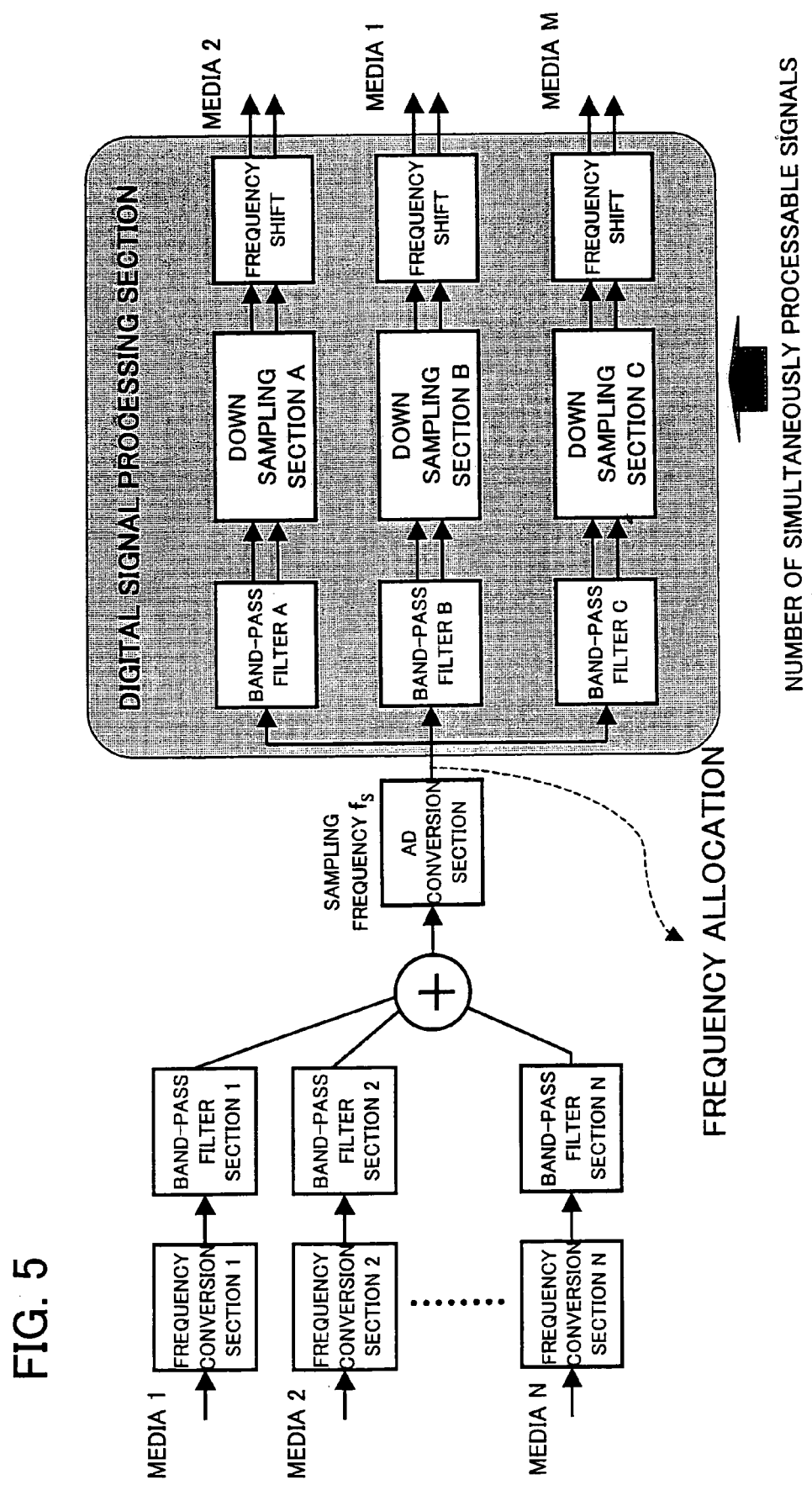
FIG. 5 is a block diagram showing the overall configuration of a receiver apparatus according to a second embodiment of the present invention.

FIG. 5 is a block diagram showing the overall configuration of a receiver apparatus according to the second embodiment of the present invention. Although the configuration of FIG. 5 is very similar to that of the first embodiment shown in FIGS. 1 and 4, the configuration of FIG. 5 greatly differs from that shown in FIGS. 1 and 4 in the frequency allocation after AD conversion.

Figure 6:
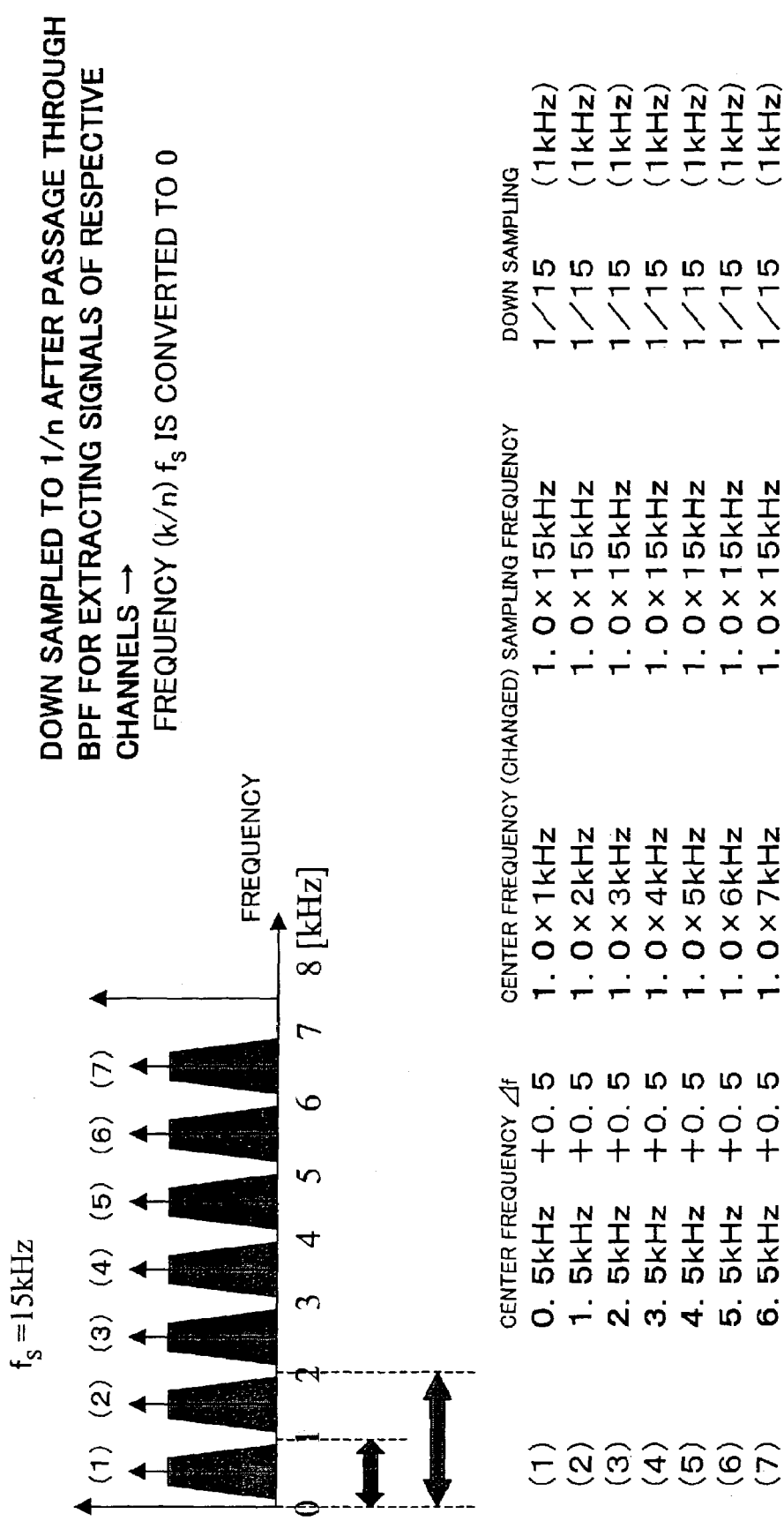
FIG. 6 is a graph showing a first example of frequency allocation after AD conversion in the receiver apparatus of the second embodiment.

FIG. 6 is a graph showing a first example of frequency allocation after AD conversion in the receiver apparatus of the second embodiment. This first exemplary frequency allocation can be applied under the following conditions.

(Condition 1)
Predetermined frequency: $F_k=1$ kHz>0.8 kHz
(a frequency greater than the bandwidth $d_k$ of the $k^{th}$ signal to be received (k=1, 2, . . . , 7)

(Condition 2)
Sampling frequency for AD conversion: $f_s=15$ kHz (Condition 3)
Frequency allocation after AD conversion:

$f_{ck}=k-0.5$ kHz (k=1, 2, . . . , 7)

(Condition 4)
Down sampling: 1/15 (n=15)

(Condition 5)
Frequency shift amount: $\Delta f=+0.5$ kHz

That is, when frequency conversion at the $k^{th}$ frequency conversion section is performed in such a manner that the frequency allocation shown in FIG. 6 is achieved after AD conversion, the frequency (k/n) fs=k kHz of the $k^{th}$ signal is converted to 0 kHz while the signal passes through the AD conversion section, the band-pass filter A, B, or C, and the down sampling section A, B or C. Therefore, through the subsequent frequency shift processing ($\Delta f=+0.5$ kHz), the band center of the $k^{th}$ media signal ($k^{th}$ target base band signal) is disposed at 0 kHz. During this operation, the frequency shift section is required only to rotate the phase of each sampled signal by $\pi$ radian as against the phase of the previous sampled signal, and therefore, the operation that the frequency shift section must perform is merely sign inversion as against the previous sampled signal. Accordingly, the frequency shift section can be simplified.

Figure 7:
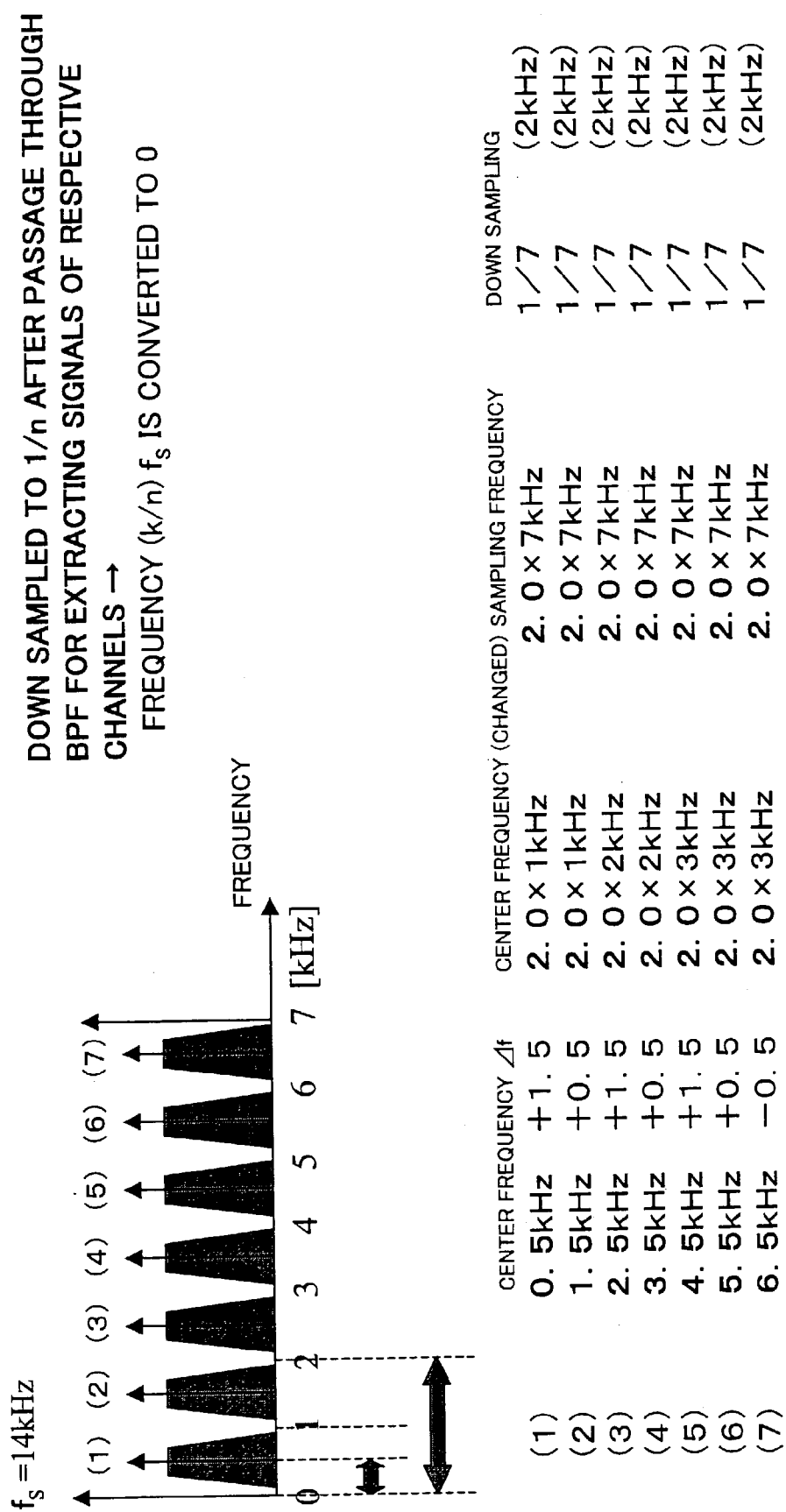
FIG. 7 is a graph showing a second example of frequency allocation after AD conversion in the receiver apparatus of the second embodiment.
Figure 8:
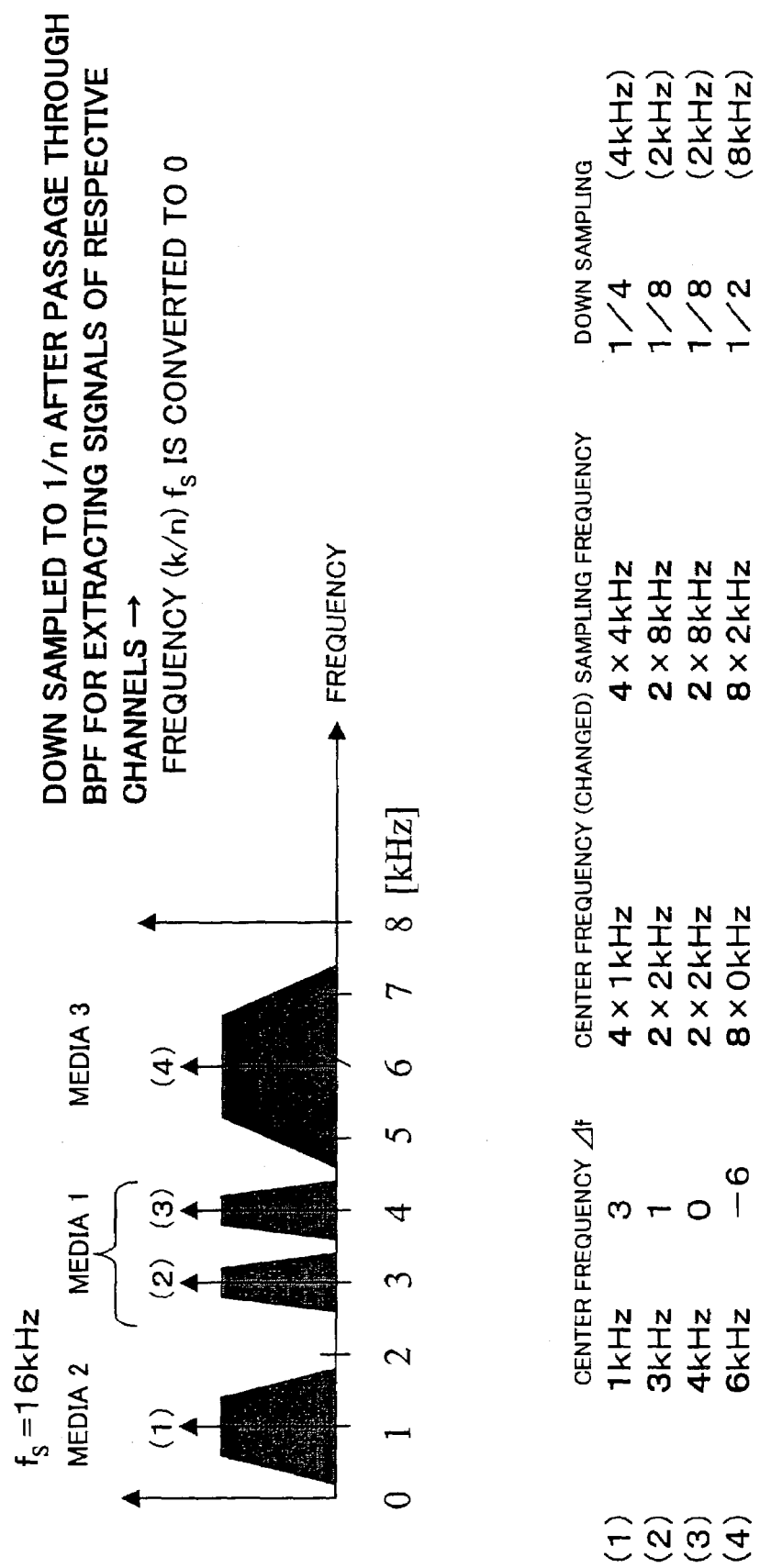
FIG. 8 is a graph showing a third example of frequency allocation after AD conversion in the receiver apparatus of the second embodiment.

FIGS. 7 and 8 are graphs showing second and third examples of frequency allocation after AD conversion in the receiver apparatus of the second embodiment.

Even when these examples of frequency allocations are employed, there can be attained an action and an effect similar to those attained in the above-described case.

Third Embodiment:

A receiver apparatus according to a third embodiment is configured such that its frequency conversion sections reallocate the signals k from the broad band A in which the signals k have been transmitted concurrently to the frequency band B in which sampling by a single AD converter is possible, in such a manner that $f_s=n_k F_k$, $f_{ck}=\mu_k F_k$, $0<f_{ck}<f_s/2$ are satisfied after AD conversion (sampling), where $f_{ck}$ represents the center frequency of the $k^{th}$ signal, $F_k$ is a predetermined frequency greater than a bandwidth dk of the $k^{th}$ signal (k=1, 2, . . . , 7), and $n_k$ and $\mu_k$ are integers.

Figure 9:
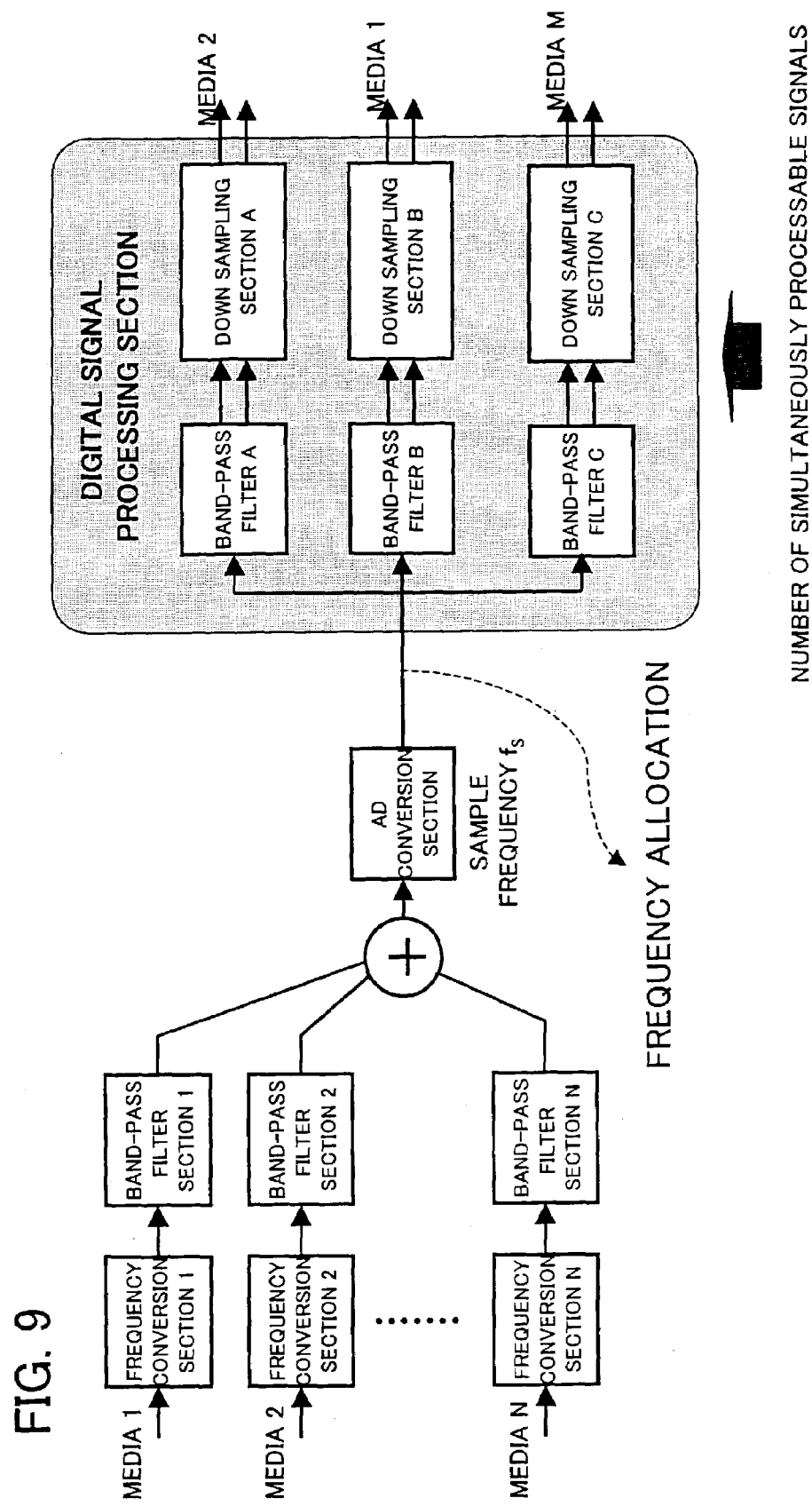
FIG. 9 is a block diagram showing the overall configuration of a receiver apparatus according to a third embodiment of the present invention.

FIG. 9 is a block diagram showing the overall configuration of a receiver apparatus according to the third embodiment of the present invention. The feature of the third embodiment resides in that the $k^{th}$ media signal ($k^{th}$ base band signal) is output directly from the down sampling section A, B, or C without being passed through the frequency shift section.

Figure 10:
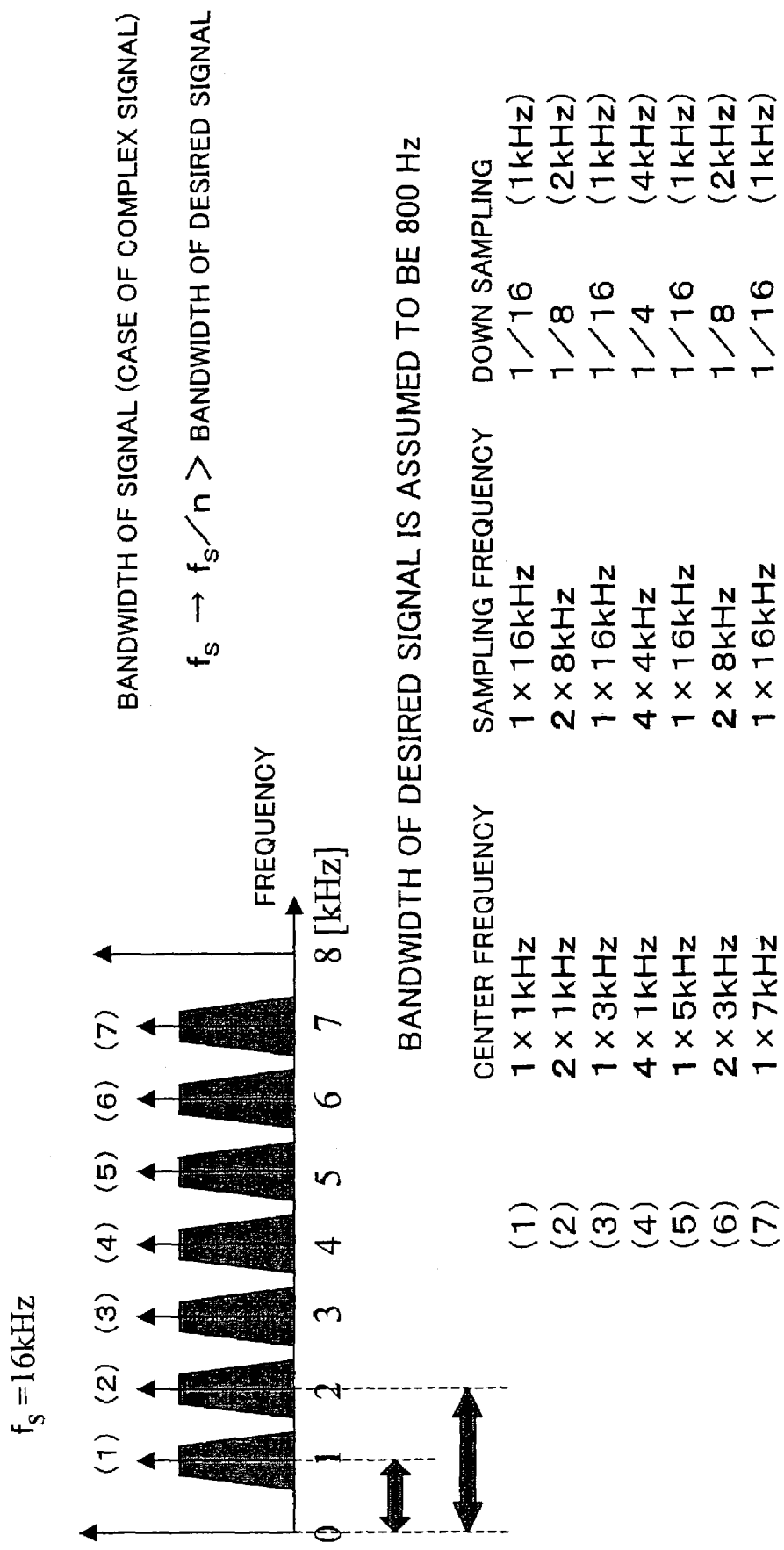
FIG. 10 is a graph showing a first example of frequency allocation after AD conversion in the receiver apparatus of the third embodiment.

FIG. 10 is a graph showing a first example of frequency allocation after AD conversion in the receiver apparatus of the third embodiment. This first example of frequency allocation can be applied under the following conditions.

(Condition 1)
Predetermined frequency: $F_k=1$, 2, 4 kHz>0.8 kHz
(a frequency greater than the bandwidth $d_k$ of the $k^{th}$ signal to be received)

(Condition 2)
Sampling frequency for AD conversion: $f_s=16$ kHz=$n_k F_k$ (Condition 3)
Frequency allocation after AD conversion: $f_{ck}=k$ kHz (k=1, 2, . . . , 7)

(Condition 4)
Down sampling: $n_k=4$, 8, 16

(Condition 5)
Frequency shift amount: $\Delta f=\pm 0$ kHz

When the above first example of frequency allocation is employed, the frequency shift value can be adjusted to 0 kHz. Therefore, the frequency shift section becomes unnecessary, and thus, the configuration of the receiver apparatus can be further simplified.

Figure 11:
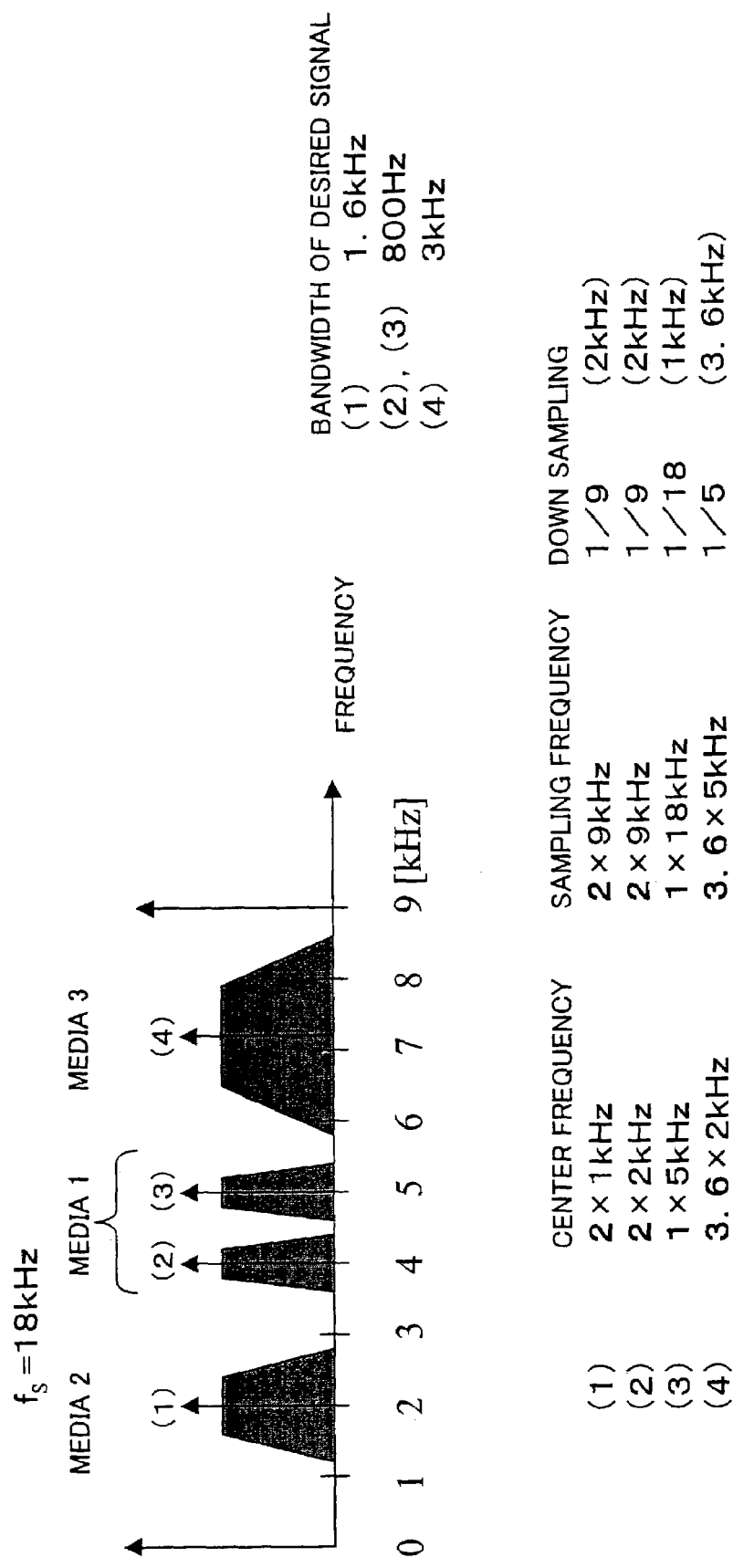
FIG. 11 is a graph showing a second example of frequency allocation after AD conversion in the receiver apparatus of the third embodiment.

FIG. 11 is a graph showing a second example of frequency allocation after AD conversion in the receiver apparatus of the third embodiment.

Even when this example of frequency allocation is used, there can be attained an action and an effect similar to those attained in the above-described case.

The above-described configuration enables most efficient utilization of not only extraction of each signal (i.e., each channel or each media) by use of filters, but also frequency conversion which utilizes frequency folding by down sampling. In other words, employment of the above-described configuration realizes extraction of an arbitrary received signal and conversion to a base band signal by use of a simple configuration. Therefore, a desired receiver apparatus can be configured more simply as compared with conventional apparatuses in which sampling is performed in the IF band, because the digital orthogonal demodulation section becomes unnecessary.

A Hilbert transformer can be used as a component of the digital filter section (channel extraction section).

Use of such a transformer enables the present invention to be implemented without use of a complex-coefficient filter, as will be described in connection with the following fourth and fifth embodiments.

Fourth Embodiment:

A receiver apparatus according to the fourth embodiment includes a Hilbert transformer and a band-pass filter (BPF) as components of the digital filter section (channel extraction section).

Figure 12:
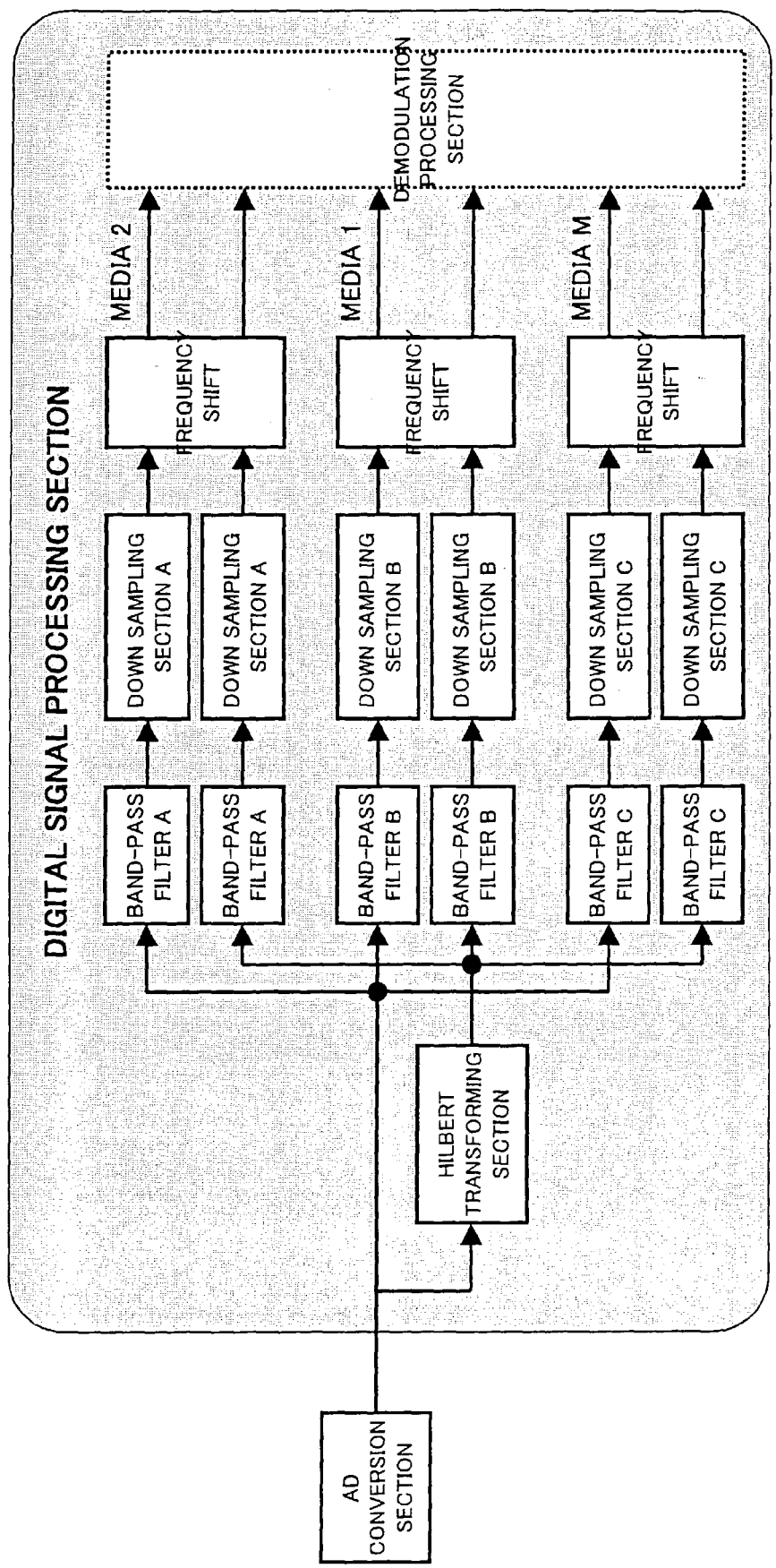
FIG. 12 is a block diagram showing a first scheme of processing digital signals after AD conversion in a receiver apparatus of a fourth embodiment of the present invention.
Figure 13:
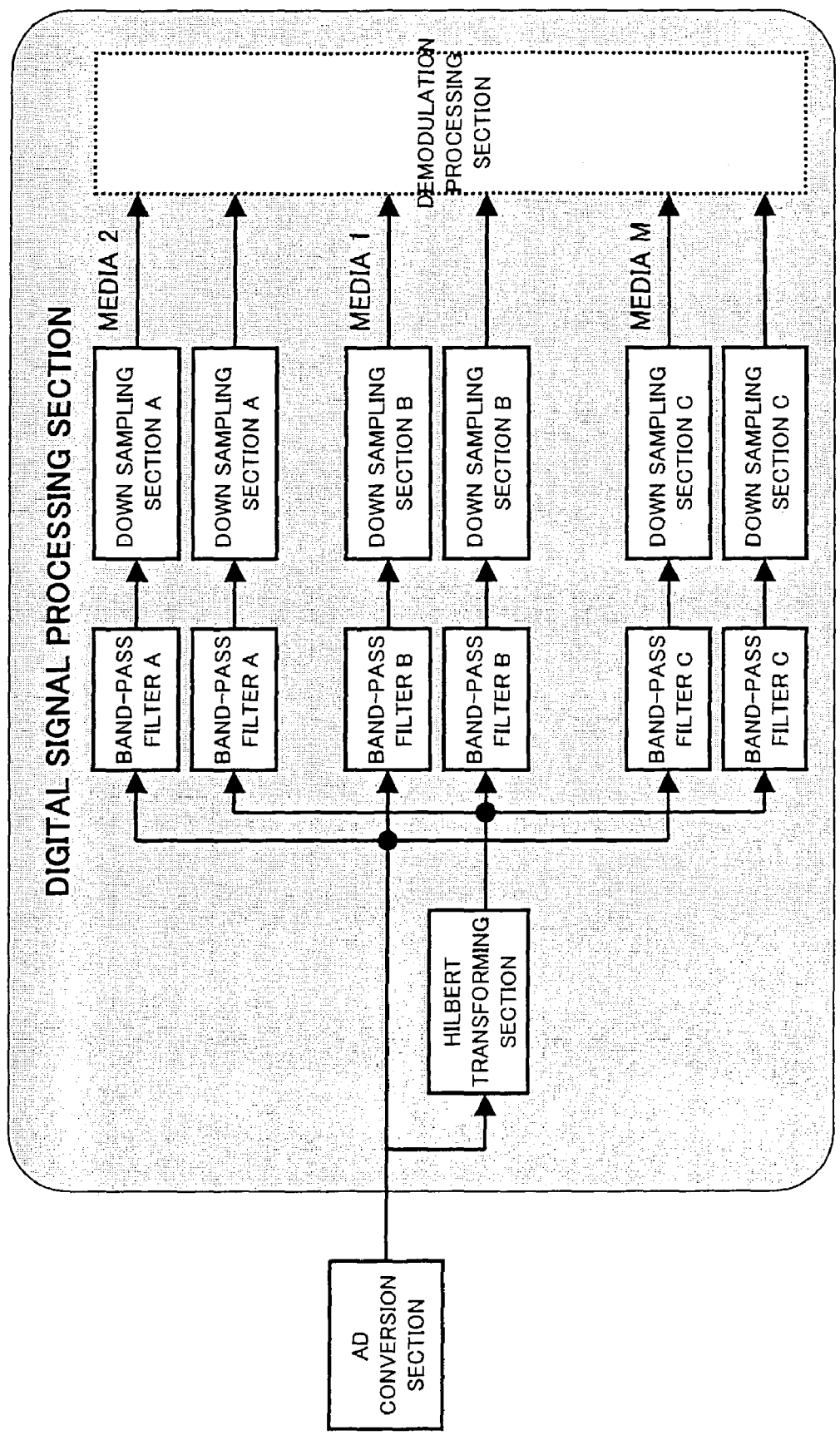
FIG. 13 is a block diagram showing a second scheme of processing digital signals after AD conversion in the receiver apparatus of the fourth embodiment.

FIGS. 12 and 13 are block diagrams showing first and second schemes (schemes 4A and 4B) of processing digital signals after AD conversion in a receiver apparatus of the fourth embodiment. The difference between the respective processing schemes in terms of presence and absence of frequency shift sections is caused by the difference in the method of adjusting the frequency shift Δf, as in the case of the difference between the second and third embodiments.

As is understood from these configurations, the receiver apparatus according to the present invention can be implemented without use of a complex-coefficient filter.

Fifth Embodiment:

A receiver apparatus according to the fifth embodiment includes a Hilbert transformer and a cascade of two band filter banks as components of the digital filter section (channel extraction section).

Figure 14:
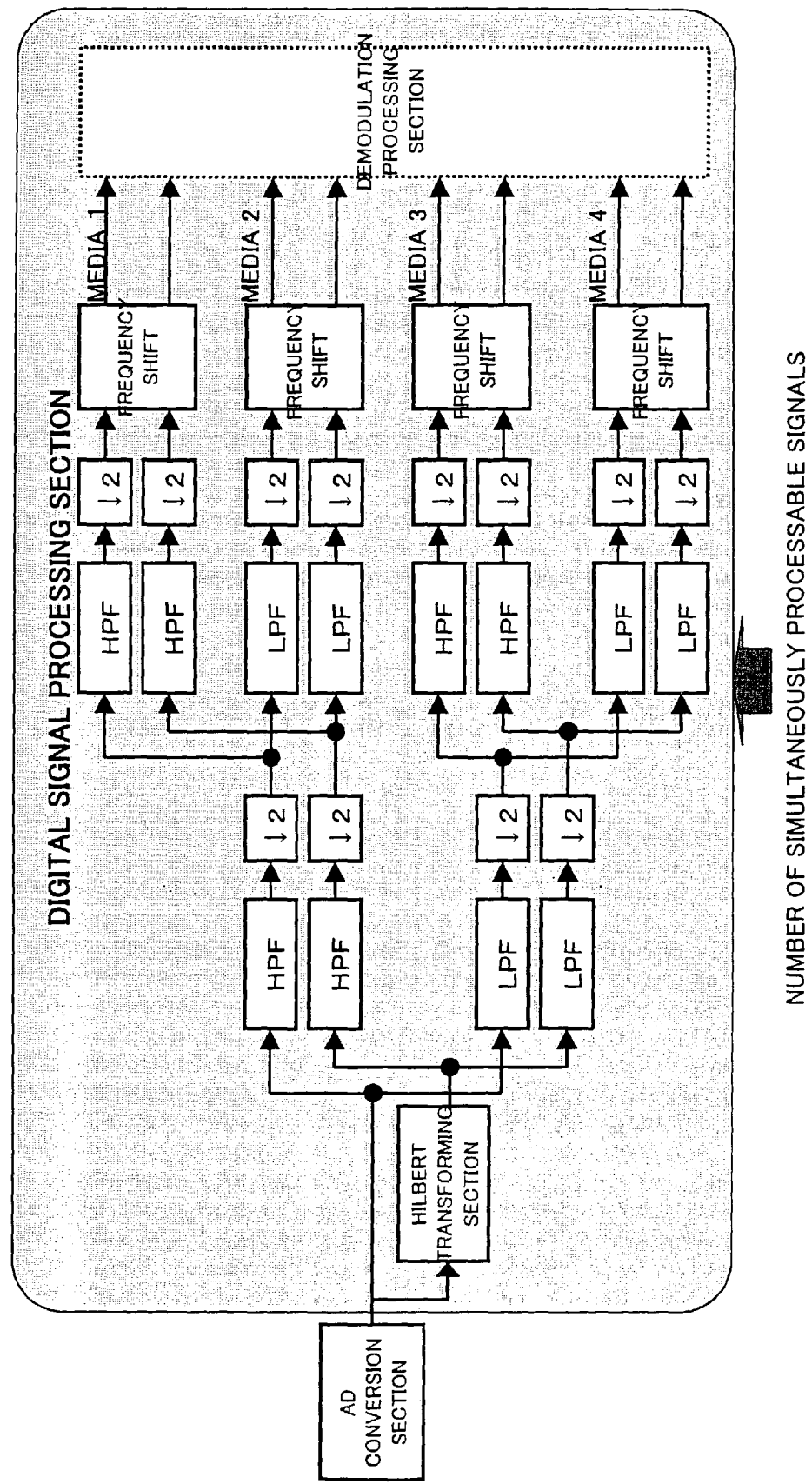
FIG. 14 is a block diagram showing a first scheme of processing digital signals after AD conversion in a receiver apparatus of a fifth embodiment of the present invention.
Figure 15:
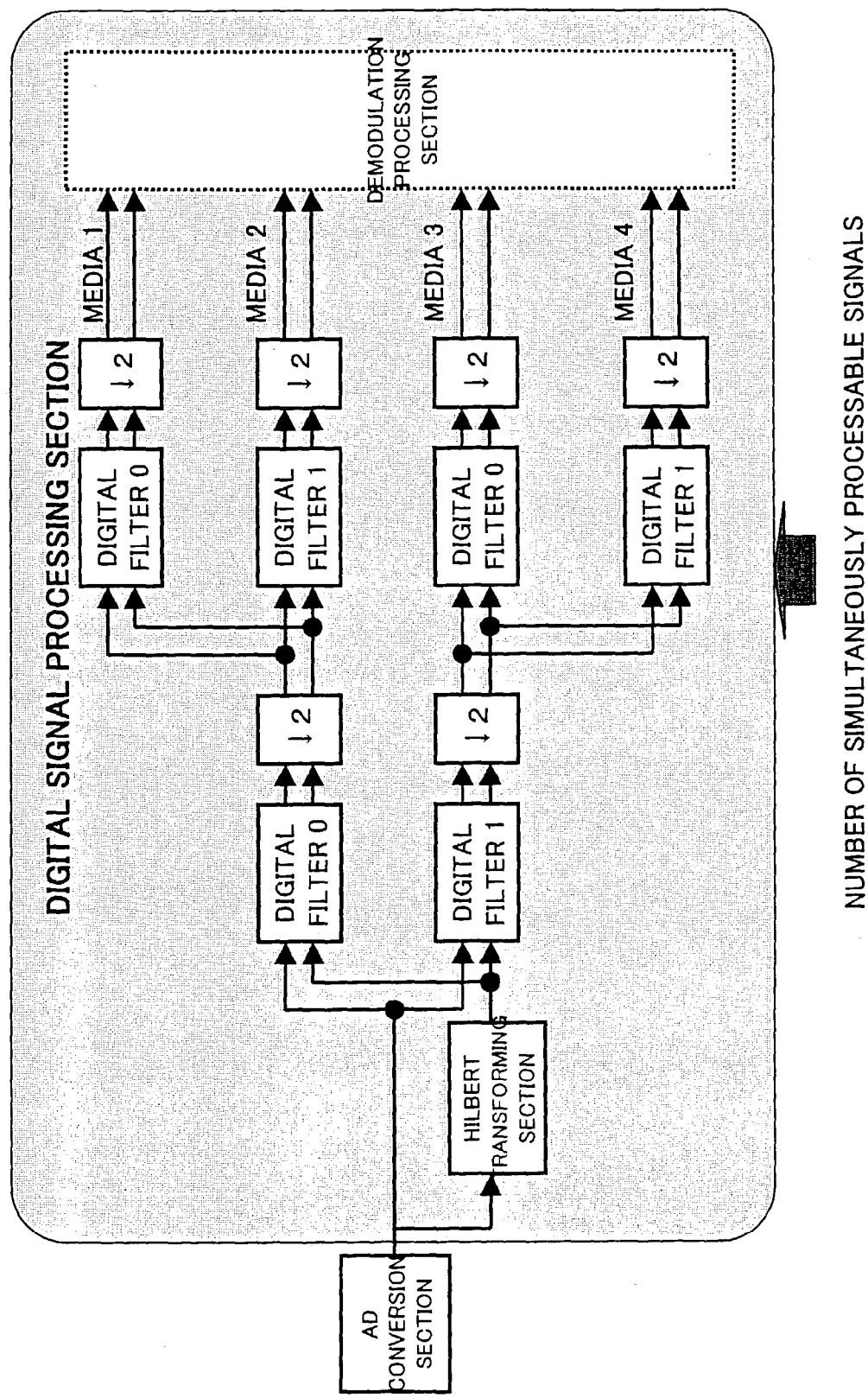
FIG. 15 is a block diagram showing a second scheme of processing digital signals after AD conversion in the receiver apparatus of the fifth embodiment.

FIGS. 14 and 15 are block diagrams showing first and second schemes (schemes 5A and 5B) of processing digital signals after AD conversion in the receiver apparatus of the fifth embodiment. In these drawings, HPF denotes a high-pass filter; LPF denotes a low-pass filter; "↓2" denotes a down sampling unit for halving the sampling rate. Further, the difference between the respective processing schemes in terms of presence and absence of frequency shift sections is caused by the difference in the method of adjusting the frequency shift Δf, as in the case of the difference between the second and third embodiments.

As is understood from these configurations, the receiver apparatus according to the present invention can be implemented without use of a complex-coefficient filter.

Sixth Embodiment:

A receiver apparatus according to the sixth embodiment includes a complex discrete Fourier transform (complex DFT) filter bank as a component of the digital filter section. Use of this scheme enables the present invention to be implemented without use of a Hilbert transformer, as will be exemplified below. Although the coefficients of the complex DFT filters are complex numbers, the real and imaginary parts can be calculated independently of each other, because the input signals are real numbers. Therefore, each of the complex DFT filters can be realized by two filters having real-number coefficients.

Figure 16:
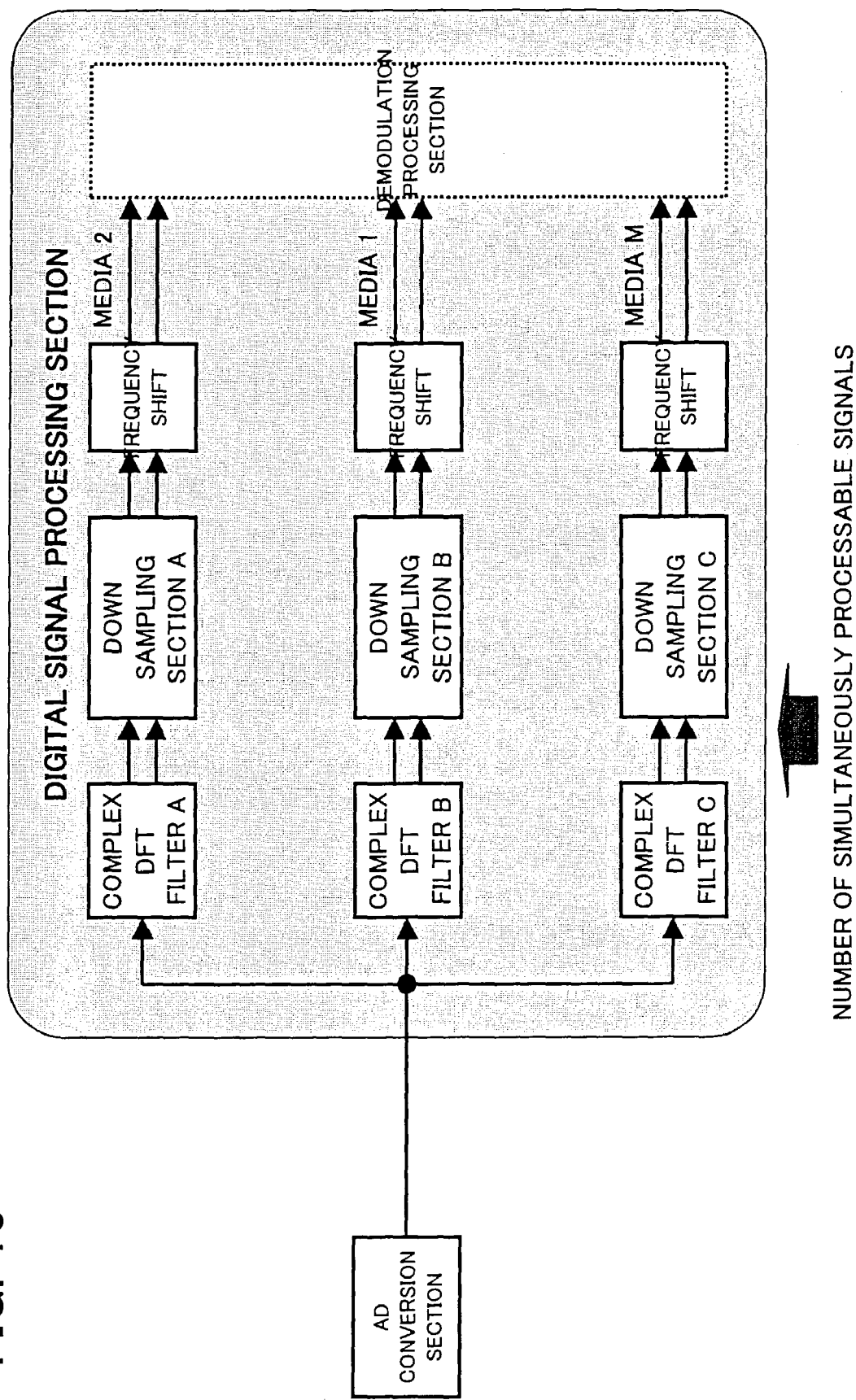
FIG. 16 is a block diagram showing a first scheme of processing digital signals after AD conversion in a receiver apparatus of a sixth embodiment of the present invention.
Figure 17:
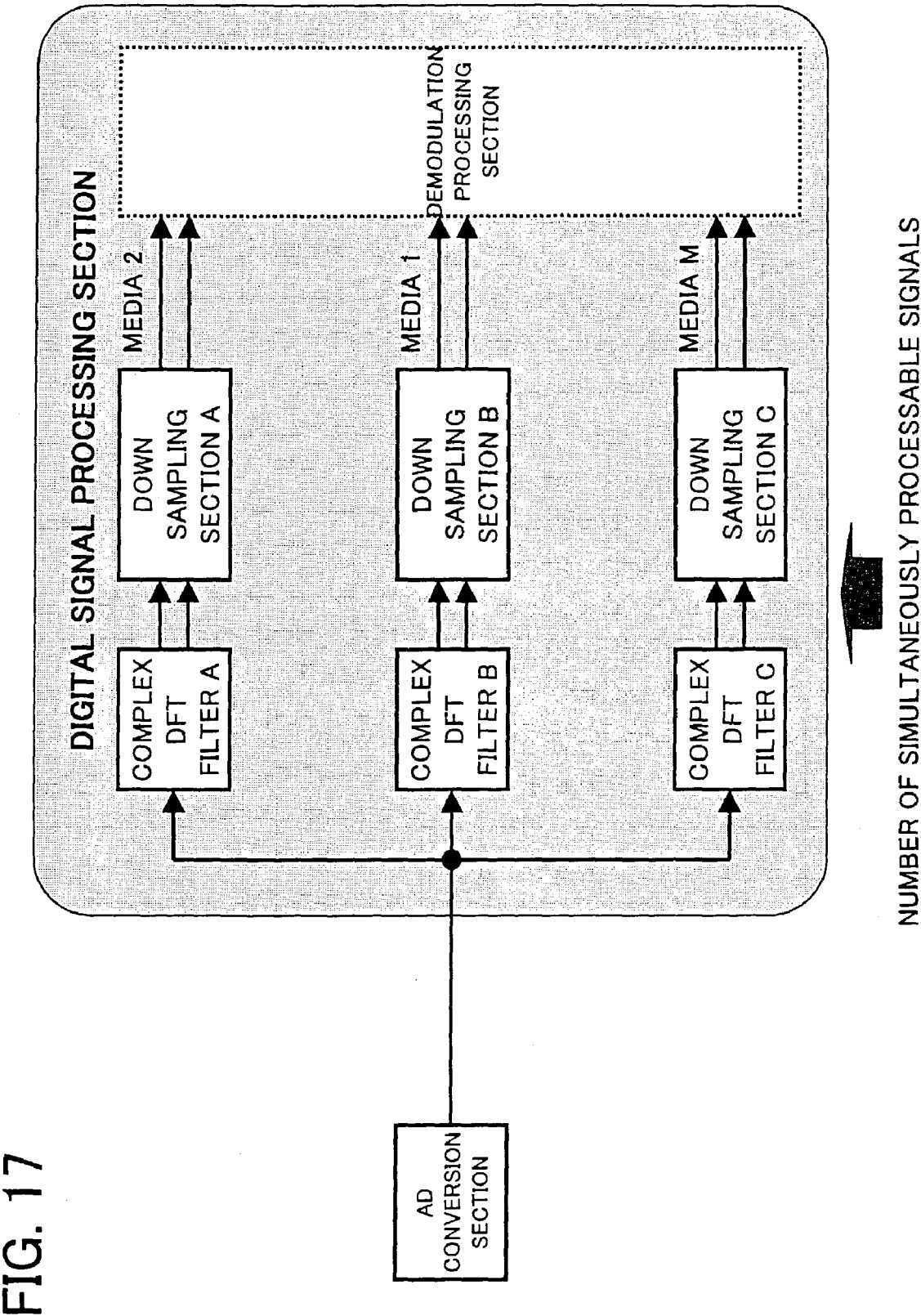
FIG. 17 is a block diagram showing a second scheme of processing digital signals after AD conversion in the receiver apparatus of the sixth embodiment.

FIGS. 16 and 17 are block diagrams showing first and second schemes (schemes 6A and 6B) of processing digital signals after AD conversion in the receiver apparatus of the sixth embodiment. The difference between the respective processing schemes in terms of presence and absence of frequency shift sections is caused by the difference in the method of adjusting the frequency shift Δf, as in the case of the difference between the second and third embodiments.

Since the receiver apparatus of the present embodiment has a configuration such that filters having real-number coefficients are connected in parallel, calculation of complex coefficients (multiplication of complex numbers) becomes unnecessary, and therefore calculation becomes simple, which facilitates simplification of the configuration.

Seventh Embodiment:

A receiver apparatus according to a seventh embodiment has the following feature. The digital filter section (channel extraction section) includes a tap coefficient setting section for setting tap coefficients for the respective signals k to be used in digital filter processing; and the tap coefficient setting section successively outputs M sets of the tap coefficients $\tau_k$ in a periodical and time-division fashion for substantially concurrent output of M target base band signals k.

Figure 18:
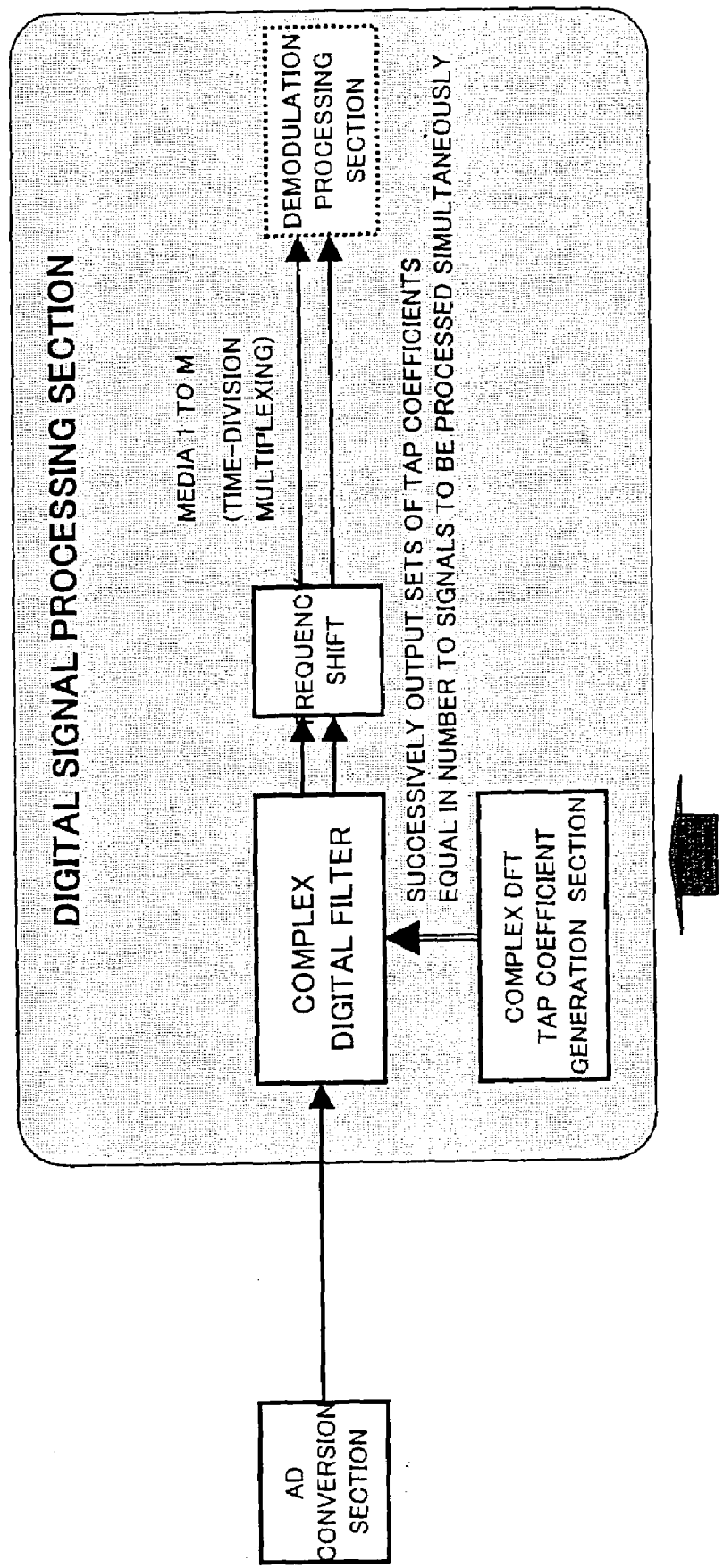
FIG. 18 is a block diagram showing a first scheme of processing digital signals after AD conversion in a receiver apparatus of a seventh embodiment of the present invention.

FIG. 18 is a block diagram showing a first scheme (scheme 7A) of processing digital signals after AD conversion in the receiver apparatus of the seventh embodiment of the present invention. In this scheme, a complex DFT tap-coefficient generation section (tap coefficient setting section) successively outputs sets of tap coefficients for M signals to be processed concurrently.

Since the combined use of a filter for extracting each channel and down sampling decreases the sampling rate of respective signals k obtained through channel extraction, processing of filter output for extracting the respective channels (signals k) are not required to be performed simultaneously if the timings of down sampling for the plurality of simultaneously received signals k are slightly shifted from one another. That is, when the above-described configuration is employed, the procedure of the filter output processing can be realized by means of time slicing.

In other words, since the setting of the channel extraction filter is changed successively in accordance with channels to be extracted, the channel extraction section consists of a single channel extraction filter and a tap coefficient setting section, whereby the configuration of the digital signal processing section can be further simplified.

Eighth Embodiment:

In a receiver apparatus according to an eighth embodiment, the digital filter section includes a complex discrete Fourier transform filter bank; and each set of the tap coefficients $\tau_k$ contains a phase correction term $a_k$ for the corresponding signal k. Thus, the configuration of the digital signal processing section is further simplified.

Figure 19:
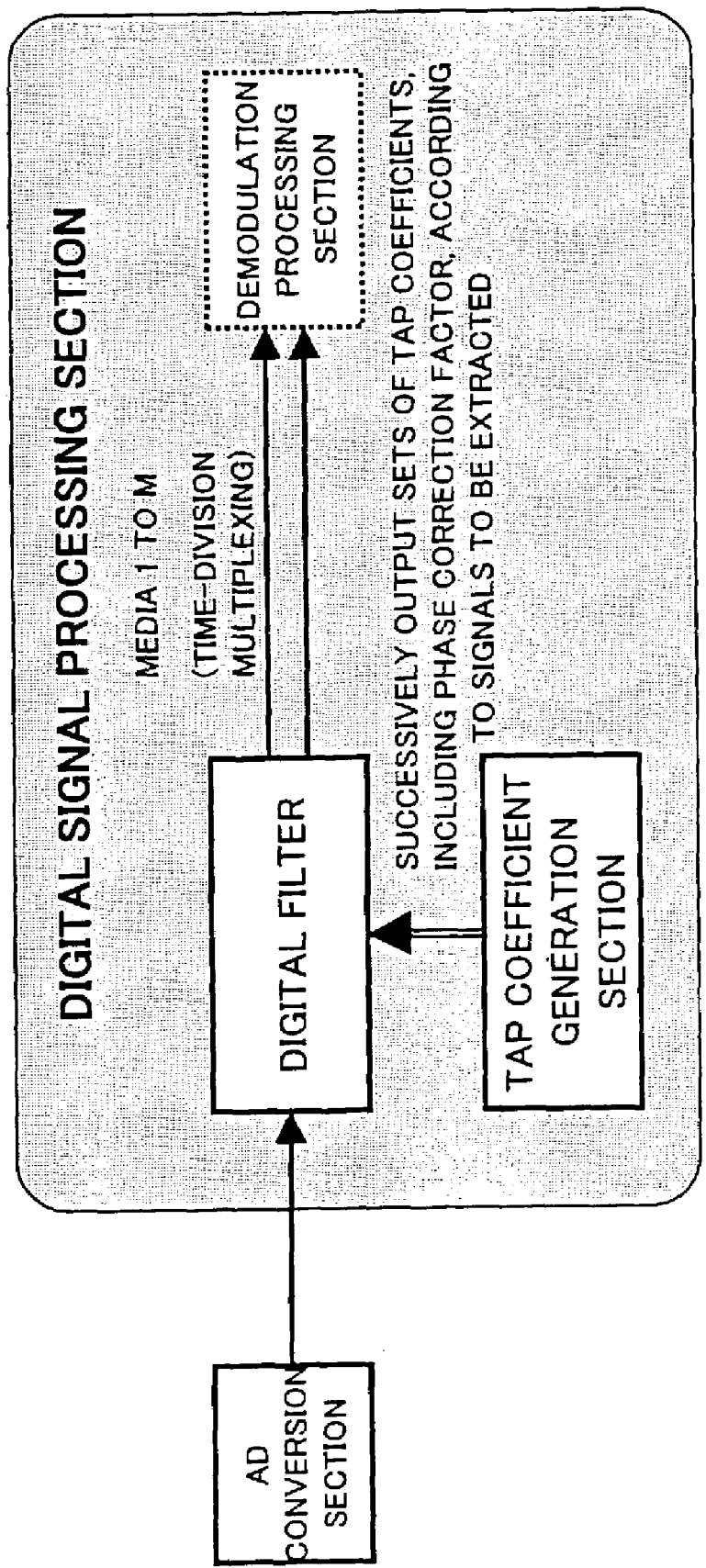
FIG. 19 is a block diagram showing a first scheme of processing digital signals after AD conversion in a receiver apparatus of an eighth embodiment of the present invention.
Figure 20:
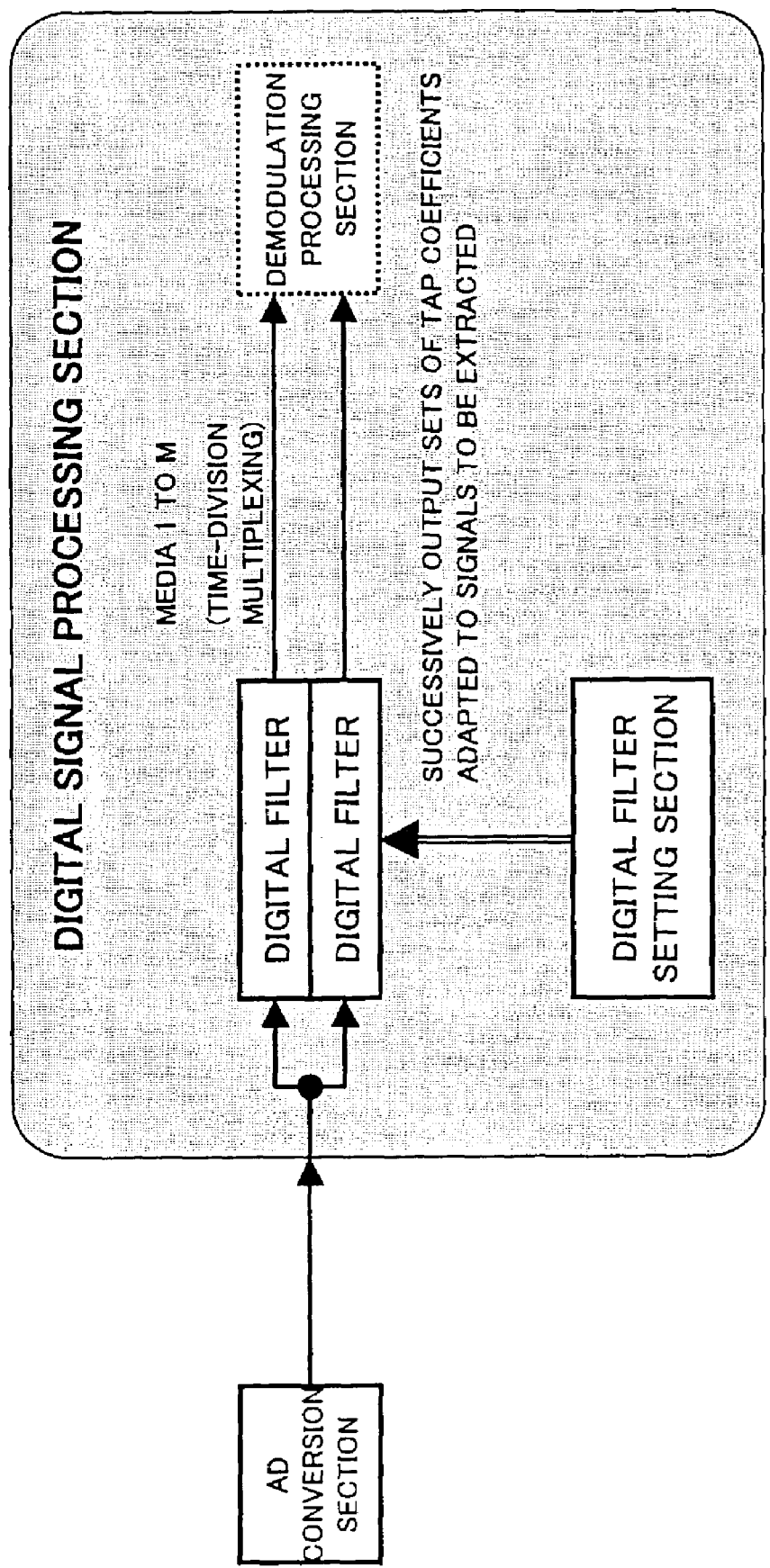
FIG. 20 is a block diagram showing a second scheme of processing digital signals after AD conversion in the receiver apparatus of the eighth embodiment.
Figure 21:
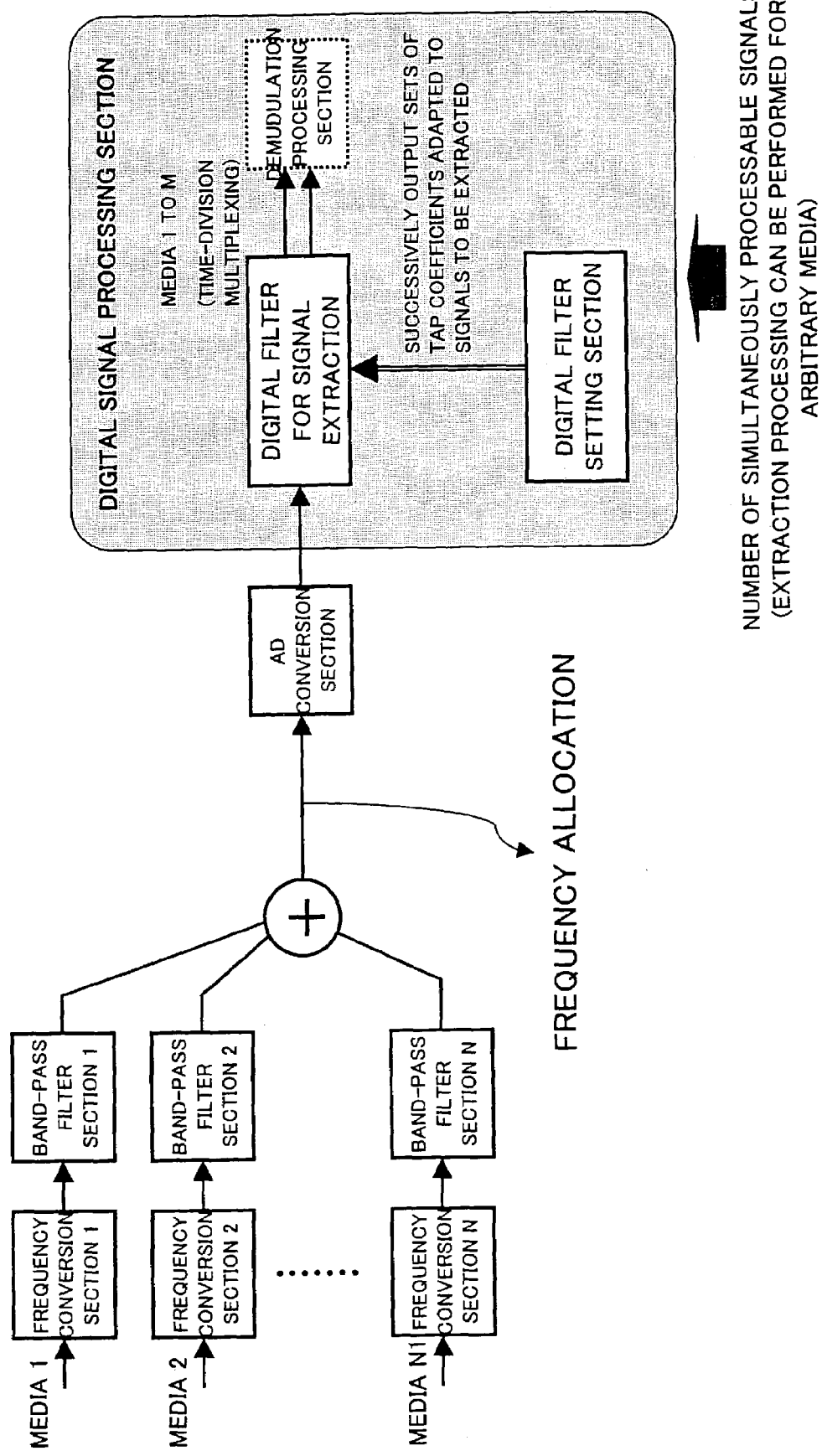
FIG. 21 is a block diagram showing the overall configuration of the receiver apparatus according to the eighth embodiment.

FIGS. 19 and 20 are block diagrams showing first and second schemes (schemes 8A and 8B) of processing digital signals after AD conversion in the receiver apparatus of the eighth embodiment. FIG. 21 is a block diagram showing the overall configuration of a receiver apparatus according to the eighth embodiment.

The above-described configuration enables the tap coefficient setting section (tap coefficient generation section/ digital filter setting section) to have a frequency shift (phase correction) function for converting each signal k to a complex base band signal by shifting the frequency, thereby further simplifying the configuration of the digital signal processing section.

Notably, the scheme of present embodiment may be combined with the schemes of the above-described second and third embodiments. In such a case, the configuration of the tap coefficient setting section (tap coefficient generation section/digital filter setting section) can be simplified further in the same manner as that employed for the frequency allocation in the second or third embodiments (FIGS. 5 to 11).

Figure 22:
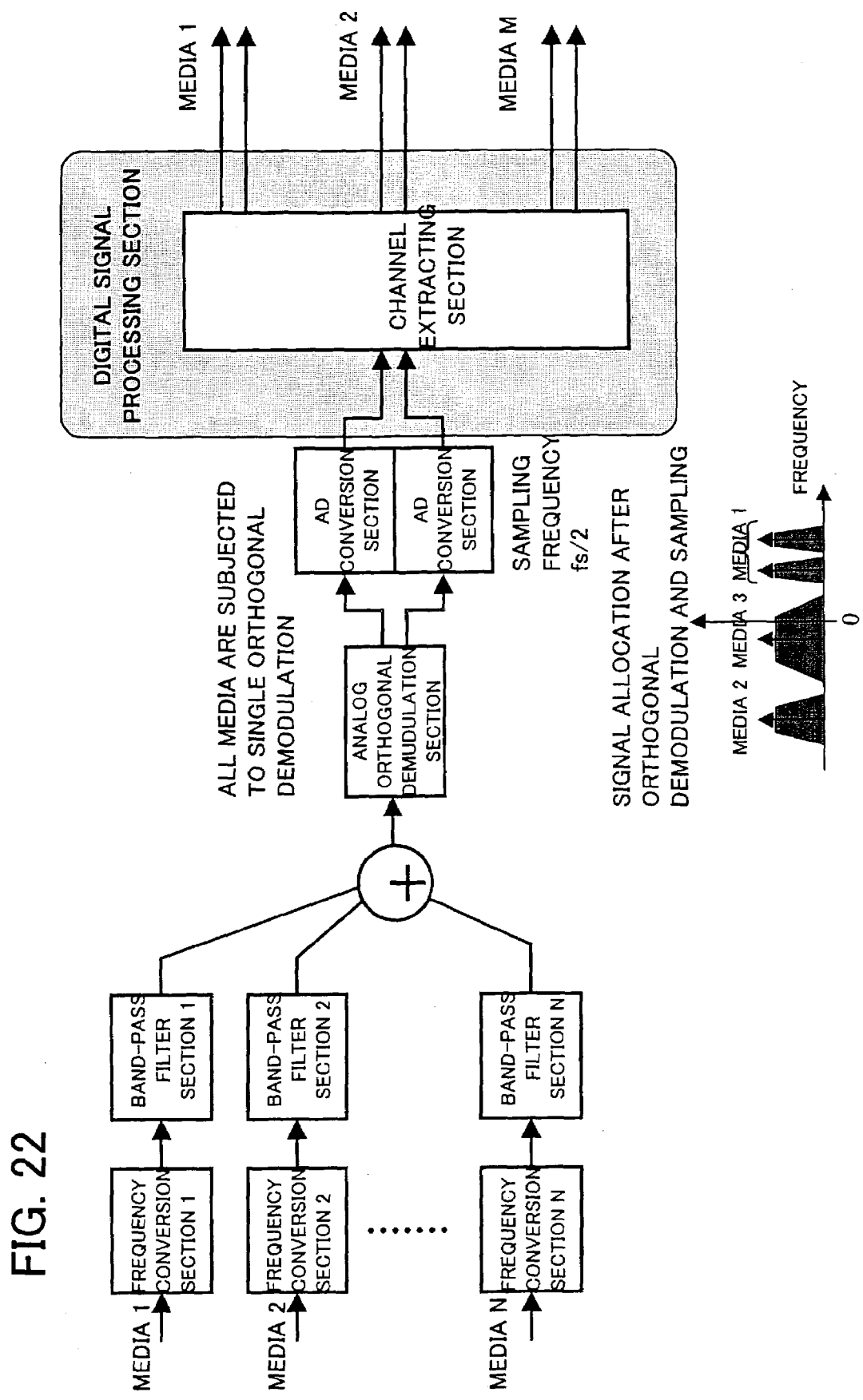
FIG. 22 is a block diagram showing the overall configuration of a receiver apparatus according to a first modification of the present invention.
Figure 23:
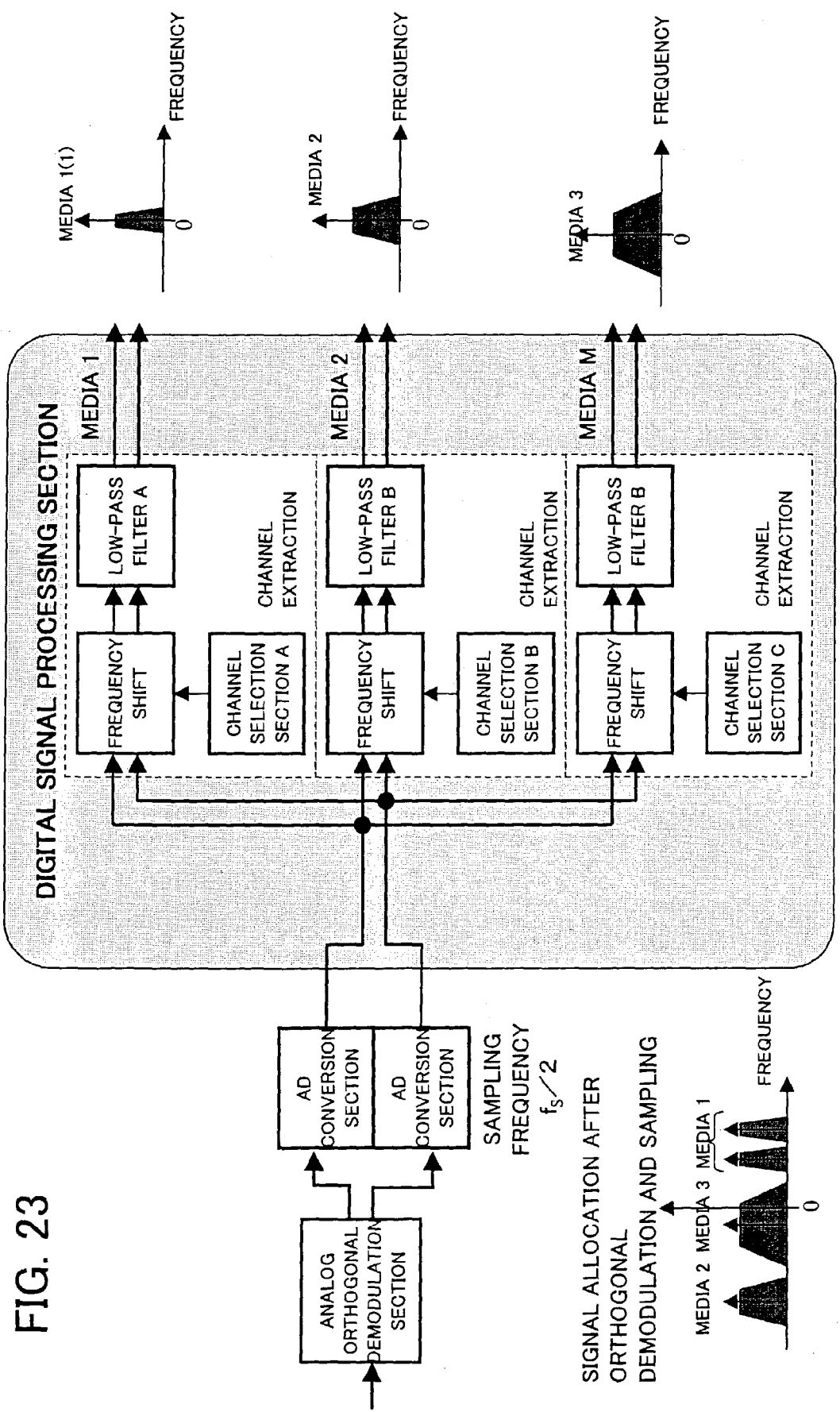
FIG. 23 is a block diagram showing a scheme of processing digital signals after AD conversion in the receiver apparatus of the first modification.

First Modification:

FIG. 22 is a block diagram showing the overall configuration of a receiver apparatus according to a first modification of the present invention; and FIG. 23 is a block diagram showing a scheme (scheme a) of processing digital signals after AD conversion in the receiver apparatus of the first modification. As is apparent from these drawings, the present invention can be applied with ease to a receiver apparatus in which an analog orthogonal demodulation section for orthogonal-demodulating an analog signal is disposed at a stage preceding the AD conversion section (sampling section).

Figure 24:
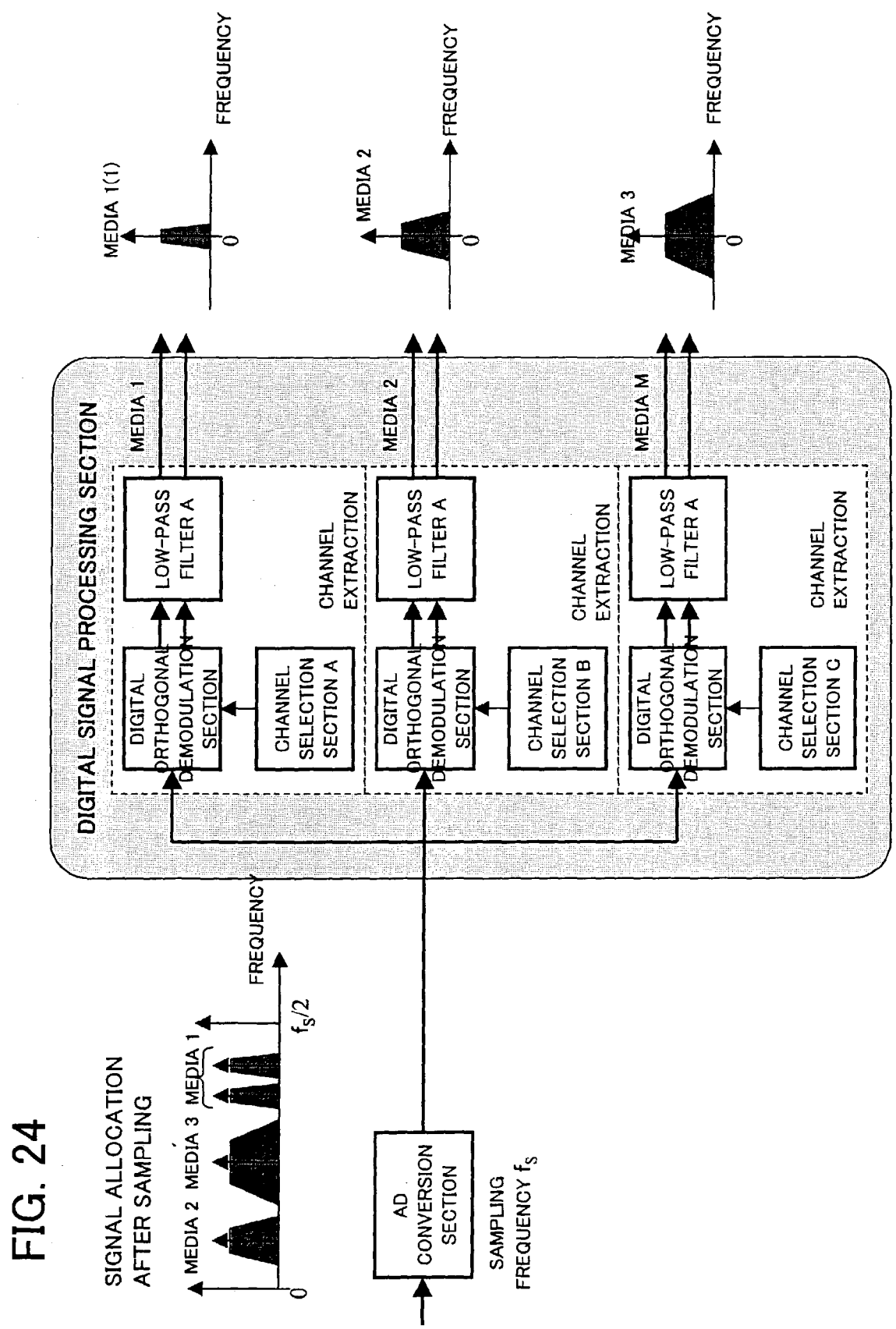
FIG. 24 is a block diagram showing a scheme of processing digital signals after AD conversion in a receiver apparatus of a second modification of the present invention.

Second Modification:

FIG. 24 is a block diagram showing a scheme (scheme b) of processing digital signals after AD conversion in a receiver apparatus of a second modification of the present invention. The present configuration (processing scheme b) may be considered a modification of or alternative to the processing scheme of FIG. 3. Further, the receiver apparatus according to the first embodiment may be modified to use such a configuration (processing scheme b).

Figure 25:
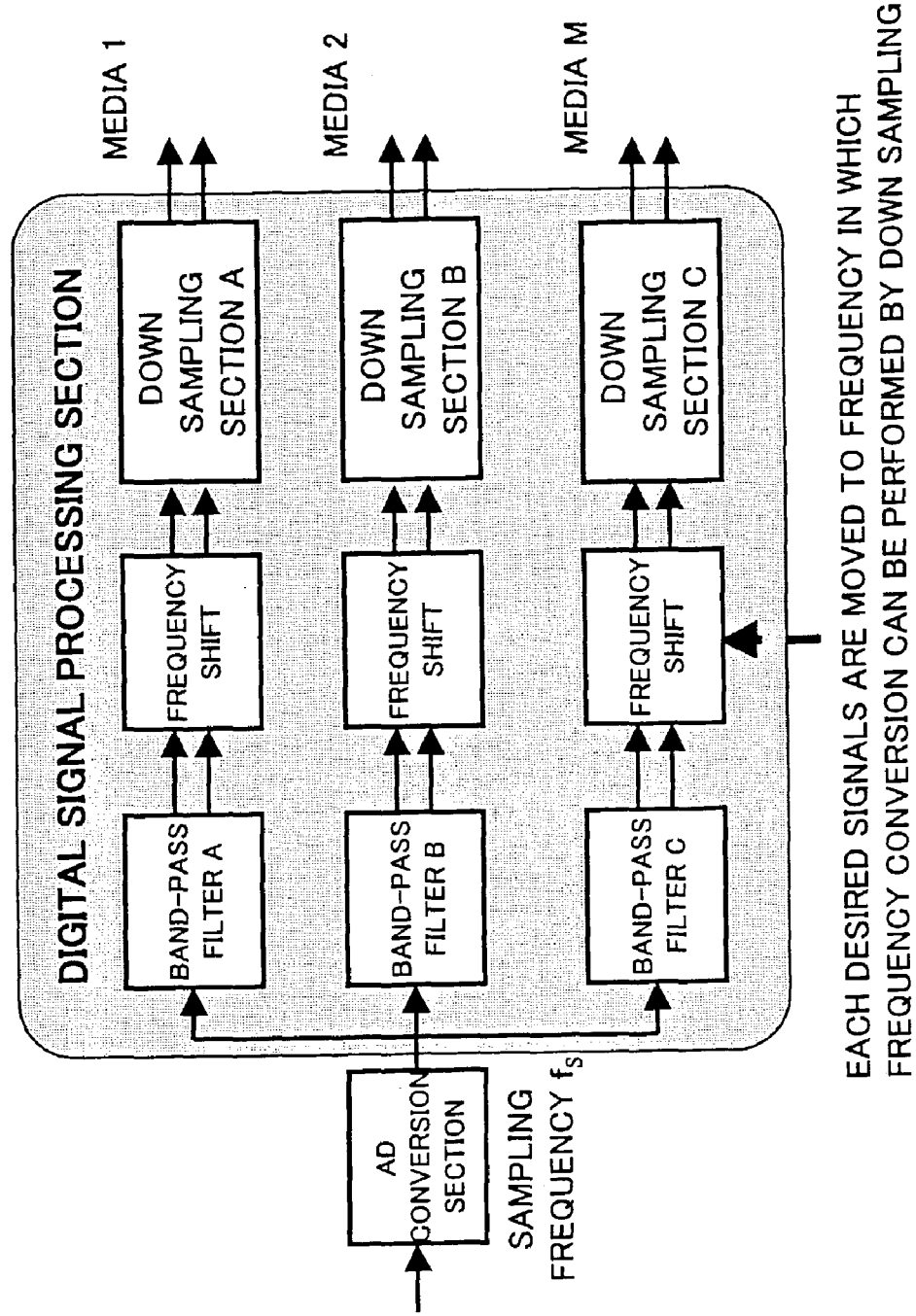
FIG. 25 is a block diagram showing a scheme of processing digital signals after AD conversion in a receiver apparatus of a third modification of the present invention.
Figure 26:
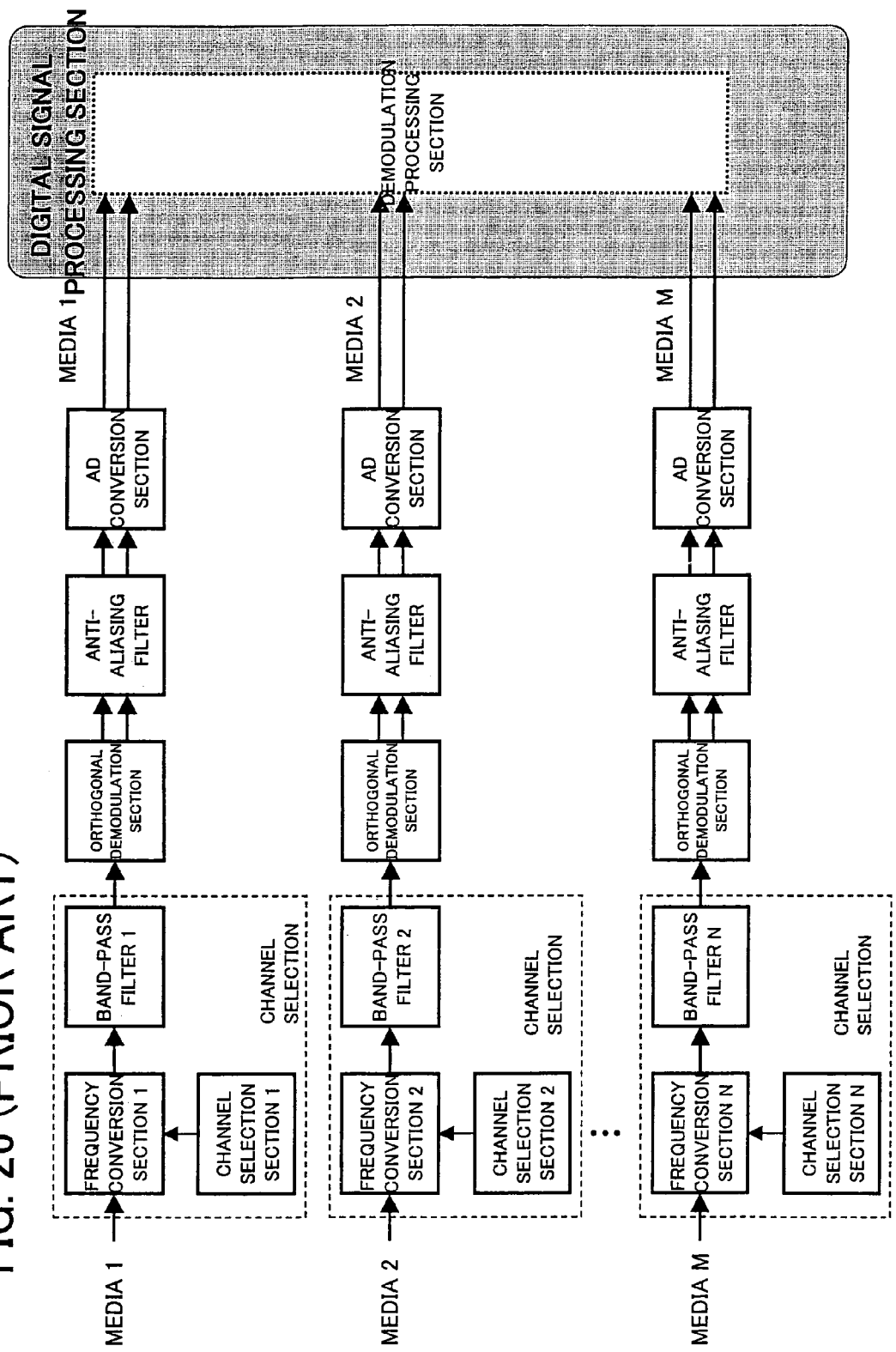
FIG. 26 is a block diagram showing the overall configuration of a conventional receiver apparatus (Conventional Example 1)
Figure 27:
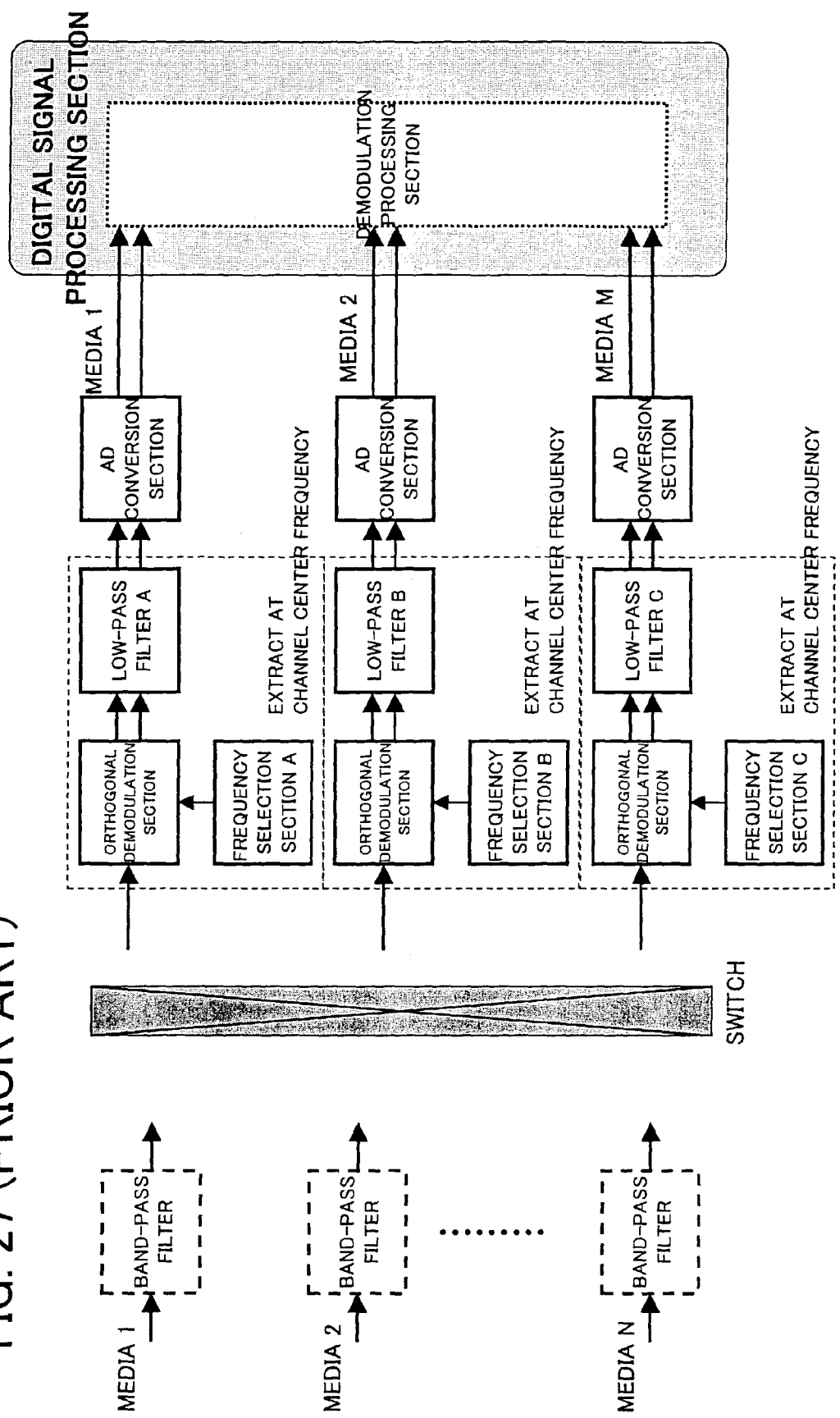
FIG. 27 is a block diagram showing the overall configuration of another conventional receiver apparatus (Conventional Example 2)
Figure 28:
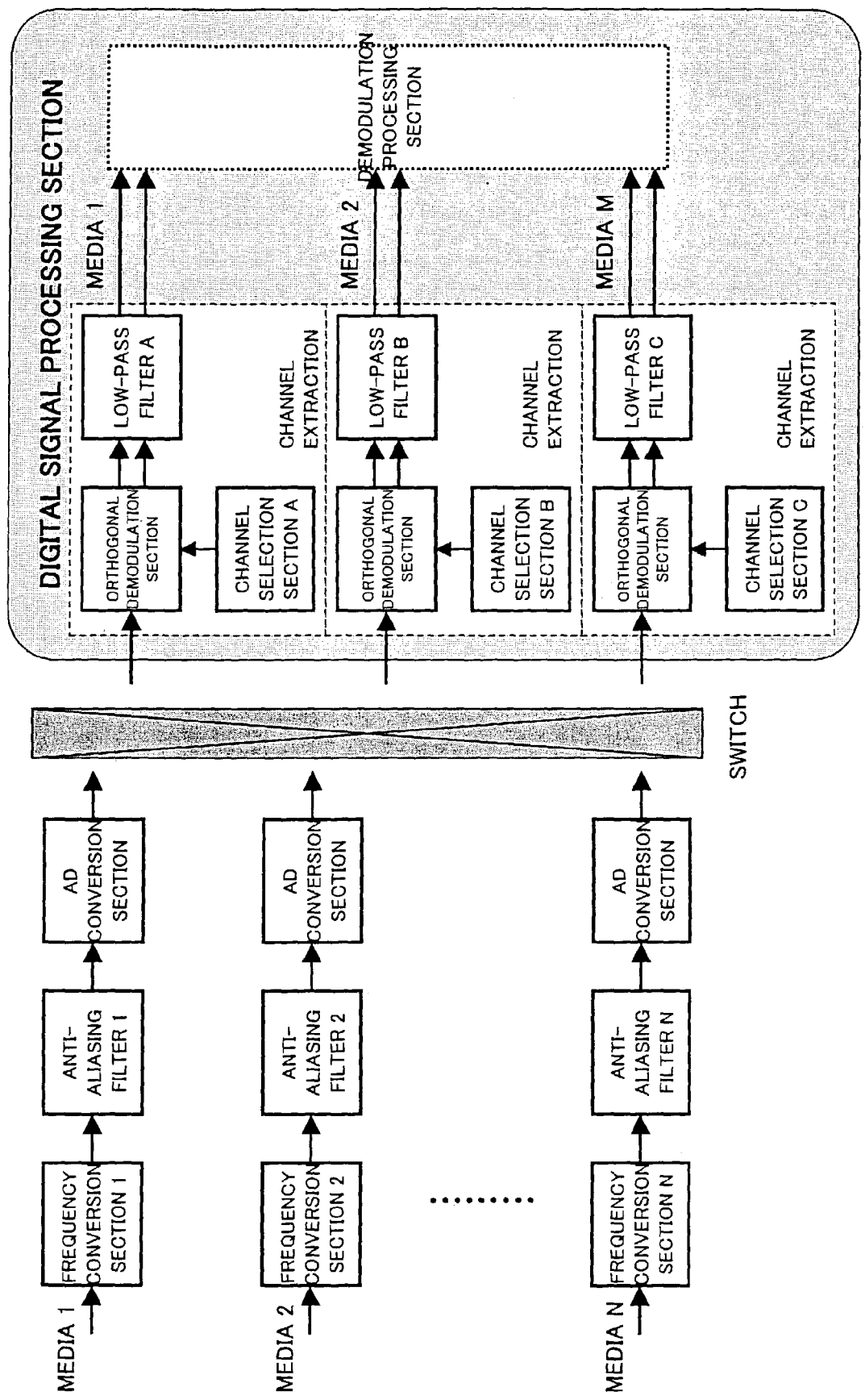
FIG. 28 is a block diagram showing the overall configuration of another conventional receiver apparatus (Conventional Example 3)
Figure 29:
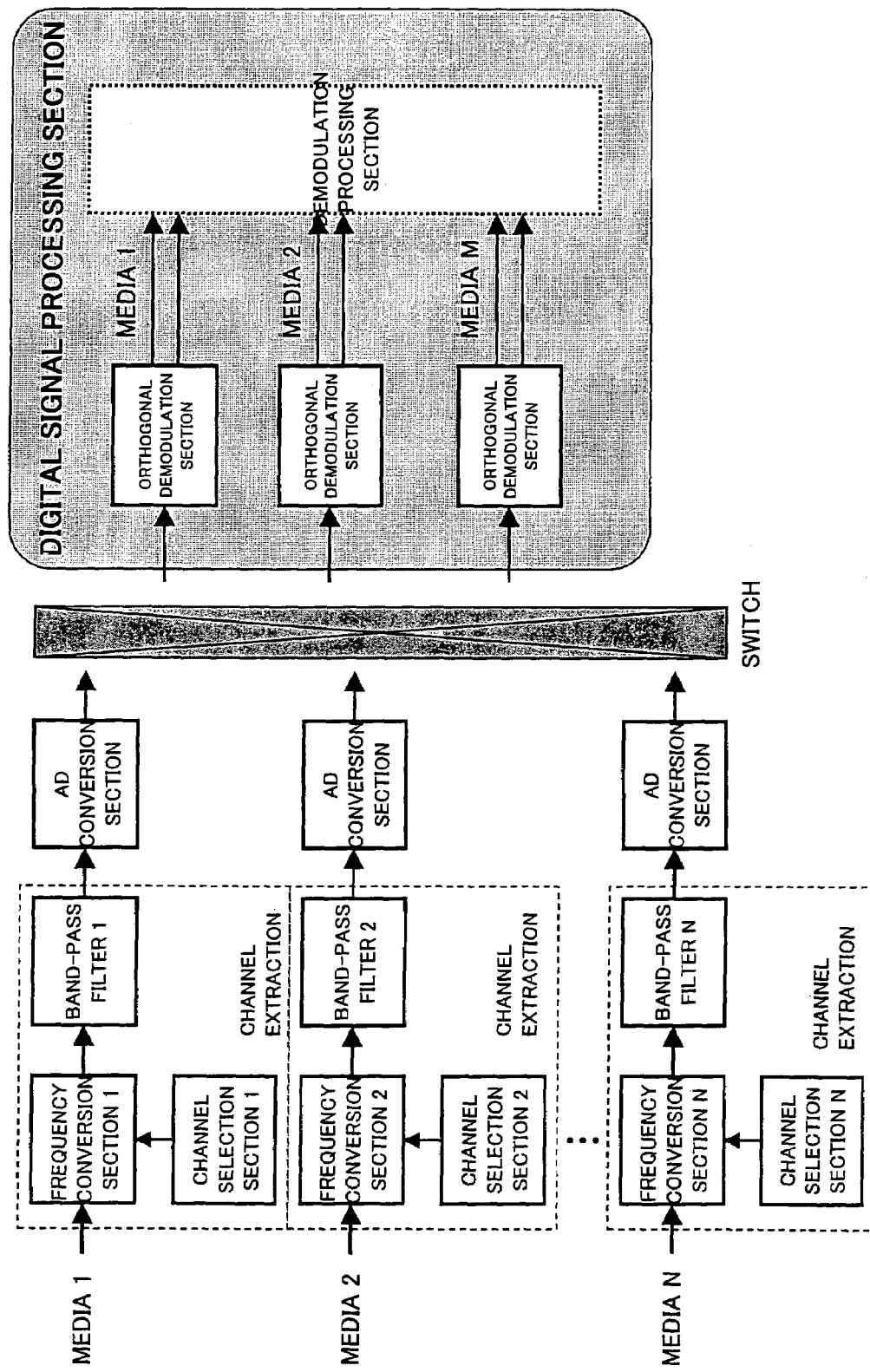
FIG. 29 is a block diagram showing the overall configuration of another conventional receiver apparatus (Conventional Example 4).

FIG. 25 is a block diagram showing a scheme (scheme c) of processing digital signals after AD conversion in a receiver apparatus of a third modification of the present invention.

As having been described at the end of the description for the first embodiment, the processing scheme c of the present modification is similar to or equivalent to that employed in the frequency shift section of the first embodiment. In the processing scheme c, the signals k are moved (subjected to frequency shift) in advance to a frequency range within which the signals k can be converted to base band signals through down sampling only.

In this case, the frequency shift section rotates the phase of each sampled signal by $2\pi (\Delta f/f_s)$ as against the previous sampled signal. In other words, the frequency shift section in the processing scheme c shifts each frequency of signals k such that the down sampling sections A, B, and C that follow the frequency shift sections can output target base band signals k (k=1, 2, ..., M) directly. Thus, the frequency of each signal k down-sampled to 1/n rate is converted from $(k/n)f_s$ kHz to 0 kHz.

Alternatively, the above described method and structure can be applied to a receiver apparatus according to the principle of the present invention. Then the transmitter apparatus can obtain substantially the same effect as the receiver apparatus of the present invention.

Obviously, numerous modifications and variations of the present invention are possible in light of the above teachings. It is therefore to be understood that within the scope of the appended claims, the present invention may be practiced otherwise than as specifically described herein.

What is claimed is:

1. A receiver apparatus for receiving substantially concurrently a plurality of signals k (k=1, 2, ..., M) transmitted while being allocated in a broad, first frequency band, the receiver apparatus comprising:

a frequency conversion section for reallocating the signals k into a second frequency band in which the signals k can be sampled;

an analog-to-digital (AD) conversion section for sampling all the signals k having been reallocated into the second frequency band at a sampling frequency $f_s$ such that digital data of the sampled signals k are obtained in a third frequency band extending from zero Hz to a frequency represented by $f_s/2$; and a signal extraction section for extracting a target base band signal k from the digital data obtained through the sampling by the AD conversion section, wherein the frequency conversion section performs the reallocation in such a manner that at least a frequency represented by $Jf_s/2$ (J is an integer) is located between the frequencies of at least two of the reallocated signals k and that the sampled signals k do not overlap one another.

2. A receiver apparatus for receiving substantially concurrently a plurality of signals k (k=1, 2, ..., M) transmitted while being allocated in a broad, first frequency band, the receiver apparatus comprising:

a frequency conversion section for reallocating the signals k into a second frequency band in which the signals k can be sampled;

an analog-to-digital (AD) conversion section for sampling all the signals k having been reallocated into the second frequency band at a sampling frequency $f_s$ such that digital data of the sampled signals k are obtained in a third frequency band extending from zero Hz to a frequency represented by $f_s/2$; and a signal extraction section for extracting a target base band signal k from the digital data obtained through the sampling by the AD conversion section, wherein the frequency conversion section performs the reallocation in such a manner that the sampling frequency $f_s$ of the AD conversion section becomes equal to a frequency represented by $n_k F_k$, where $n_k$ is an integer, and $F_k$ is a predetermined frequency greater than each bandwidth $d_k$ of the signals k, that each center frequency $f_{ck}$ of the signals k becomes equal to a frequency represented by $m_k F_k/4$, where $m_k$ is an integer (integer multiple: if "integer I≠integer L," then "$m_I \neq m_L$"), and that the sampled signals do not overlap one another.

3. A receiver apparatus according to claim 1, wherein the frequency conversion section performs the reallocation in such a manner that the sampling frequency $f_s$ of the AD conversion section becomes equal to a frequency represented by $n_k F_k$, where $n_k$ is an integer, and $F_k$ is a predetermined frequency greater than each bandwidth $d_k$ of the signals k, that each center frequency $f_{ck}$ of the signals k becomes equal to a frequency represented by $m_k F_k/4$, where $m_k$ is an integer (integer multiple: if "n integer I≠integer L," then "$m_I \neq m_L$"), and that the sampled signals do not overlap one another.

4. A receiver apparatus according to claim 2, wherein the integer $m_k$ corresponding to each of the signals k is a multiple of 2.

5. A receiver apparatus according to claim 3, wherein the integer $m_k$ corresponding to each of the signals k is a multiple of 2.

6. A receiver apparatus according to claim 2, wherein the integer $m_k$ corresponding to each of the signals k is a multiple of 4.

7. A receiver apparatus according to claim 3, wherein the integer $m_k$ corresponding to each of the signals k is a multiple of 4.

8. A receiver apparatus for receiving substantially concurrently a plurality of signals k (k=1, 2, ..., M) transmitted while being allocated in a broad, first frequency band, the receiver apparatus comprising:

a frequency conversion section for reallocating the signals k into a second frequency band in which the signals k can be sampled;

an AD conversion section for sampling all the signals k having been reallocated into the second frequency band at a sampling frequency $f_s$ such that digital data of the sampled signals k are obtained in a third frequency band extending from zero Hz to a frequency represented by $f_s/2$; and a signal extraction section for extracting a target base band signal k from the digital data obtained through the sampling by the AD conversion section, wherein the signal extraction section includes a digital filter section for filtering the digital data, and a down sampling section for down-sampling the filtered digital data, and the frequency conversion section performs the reallocation in such a manner that the sampled signals k do not overlap one another.

9. A receiver apparatus according to claim 1, wherein the signal extraction section includes a digital filter section for filtering the digital data, and a down sampling section for down-sampling the filtered digital data.

10. A receiver apparatus according to claim 2, wherein the signal extraction section includes a digital filter section for filtering the digital data, and a down sampling section for down-sampling the filtered digital data.

11. A receiver apparatus according to claim 3, wherein the signal extraction section includes a digital filter section for filtering the digital data, and a down sampling section for down-sampling the filtered digital data.

12. A receiver apparatus according to claim 4, wherein the signal extraction section includes a digital filter section for filtering the digital data, and a down sampling section for down-sampling the filtered digital data.

13. A receiver apparatus according to claim 6, wherein the signal extraction section includes a digital filter section for filtering the digital data, and a down sampling section for down-sampling the filtered digital data.

14. A receiver apparatus according to claim 8, wherein the digital filter section includes a Hubert transformer.

15. A receiver apparatus according to claim 9, wherein the digital filter section includes a Hilbert transformer.

16. A receiver apparatus according to claim 10, wherein the digital filter section includes a Hilbert transformer.

17. A receiver apparatus according to claim 8, wherein the digital filter section includes band-pass filters corresponding to the signals k, respectively.

18. A receiver apparatus according to claim 9, wherein the digital filter section includes band-pass filters corresponding to the signals k, respectively.

19. A receiver apparatus according to claim 10, wherein the digital filter section includes band-pass filters corresponding to the signals k, respectively.

20. A receiver apparatus according to claim 8, wherein the digital filter section includes a cascade of two band filter banks.

21. A receiver apparatus according to claim 9, wherein the digital filter section includes a cascade of two band filter banks.

22. A receiver apparatus according to claim 10, wherein the digital filter section includes a cascade of two band filter banks.

23. A receiver apparatus according to claim 8, wherein the digital filter section includes a complex discrete Fourier transform filter bank.

24. A receiver apparatus according to claim 9, wherein the digital filter section includes a complex discrete Fourier transform filter bank.

25. A receiver apparatus according to claim 10, wherein the digital filter section includes a complex discrete Fourier transform filter bank.

26. A receiver apparatus according to claim 8, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

27. A receiver apparatus according to claim 9, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

28. A receiver apparatus according to claim 10, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

29. A receiver apparatus according to claim 16, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

30. A receiver apparatus according to claim 19, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

31. A receiver apparatus according to claim 22, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

32. A receiver apparatus according to claim 25, wherein the digital filter section includes a tap coefficient setting section for setting tap coefficients for the respective signals k to be used in digital filter processing, wherein
the tap coefficient setting section successively outputs M sets of tap coefficients in a periodical and time-division fashion for output of M target base band signals k.

33. A receiver apparatus according to claim 25, wherein
the digital filter section includes a complex discrete Fourier transform filter bank, and a tap coefficient setting section for setting tap coefficients for the respective signals k to be used in digital filter processing, wherein
the tap coefficient setting section successively outputs sets of tap coefficients, the tap coefficients being determined in consideration of a phase compensation factor for the corresponding signal k, in a periodical and time-division fashion for output of M target base band signals k.

* * * * *